(12) United States Patent
Fukuda

(10) Patent No.: US 8,854,523 B2
(45) Date of Patent: Oct. 7, 2014

(54) PHOTOGRAPHING APPARATUS, PHOTOGRAPHING CONTROL METHOD AND PHOTOGRAPHING CONTROL PROGRAM FOR PROVIDING ENHANCED PHOTOS AND ANIMATIONS

(75) Inventor: Kenichiro Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 13/504,353

(22) PCT Filed: Oct. 19, 2010

(86) PCT No.: PCT/JP2010/006191
§ 371 (c)(1),
(2), (4) Date: Apr. 26, 2012

(87) PCT Pub. No.: WO2011/055498
PCT Pub. Date: May 12, 2011

(65) Prior Publication Data
US 2012/0212650 A1    Aug. 23, 2012

(30) Foreign Application Priority Data

Nov. 5, 2009    (JP) .................................. 2009-254248

(51) Int. Cl.
| | |
|---|---|
| H04N 5/222 | (2006.01) |
| G06F 3/042 | (2006.01) |
| G06F 3/03 | (2006.01) |
| H04N 5/232 | (2006.01) |
| G03B 15/00 | (2006.01) |
| G06F 3/041 | (2006.01) |

(52) U.S. Cl.
CPC ................ *G03B 15/00* (2013.01); *G06F 3/042* (2013.01); *G06F 3/0304* (2013.01); *H04N 5/232* (2013.01); *H04N 5/23216* (2013.01); *G06F 3/0412* (2013.01)

USPC ............ 348/333.01; 348/333.02; 348/333.11; 348/333.12

(58) Field of Classification Search
USPC ............... 348/333.1, 333.01, 333.02, 333.11, 348/333.12
See application file for complete search history.

(56) References Cited

U.S. PATENT DOCUMENTS

| | | | |
|---|---|---|---|
| 2008/0165141 A1* | 7/2008 | Christie | ........................ 345/173 |
| 2009/0015555 A1 | 1/2009 | Takashima et al. | |

(Continued)

FOREIGN PATENT DOCUMENTS

| | | |
|---|---|---|
| JP | 2004-172851 | 6/2004 |
| JP | 2004 172851 | 6/2004 |

(Continued)

OTHER PUBLICATIONS

International Search Report Issued Feb. 1, 2011 in PCT/JP10/06191 Filed Oct. 19, 2010.

*Primary Examiner* — Antoinette Spinks
(74) *Attorney, Agent, or Firm* — Oblon, Spivak, McClelland, Maier & Neustadt, L.L.P.

(57) ABSTRACT

An electronic device and method of controlling the electronic device in which the electronic device includes a digital camera function. A touchless screen is configured to display an image. A control unit is configured to sense an operation member held over an area of the touchless screen without the operation member touching the touchless screen, and the control unit is further configured to determine at least one of a size or a position of the operation member held over the area of the touchless screen, and to control at least one digital camera operation based on the sensed at least one of size or position.

28 Claims, 21 Drawing Sheets

HOW OPTICAL SENSOR SCANS AT EACH PIXEL POSITION

(56) References Cited

U.S. PATENT DOCUMENTS

| | | | |
|---|---|---|---|
| 2009/0251423 A1* | 10/2009 | Jung | 345/173 |
| 2010/0137027 A1* | 6/2010 | Kim | 455/556.1 |

FOREIGN PATENT DOCUMENTS

| | | |
|---|---|---|
| JP | 2006-14074 | 1/2006 |
| JP | 2006 14074 | 1/2006 |
| JP | 2007-52497 | 3/2007 |
| JP | 2007 52497 | 3/2007 |
| JP | 2007-141177 | 6/2007 |
| JP | 2007 141177 | 6/2007 |
| JP | 2008-97172 | 4/2008 |
| JP | 2008 97172 | 4/2008 |
| JP | 2009 20759 | 1/2009 |
| JP | 2009-20759 | 1/2009 |

* cited by examiner

1 PHOTOGRAPHING APPARATUS

CIRCUIT CONFIGURATION OF PHOTOGRAPHING APPARATUS
ACCORDING TO EMBODIMENT

10 DIGITAL CAMERA

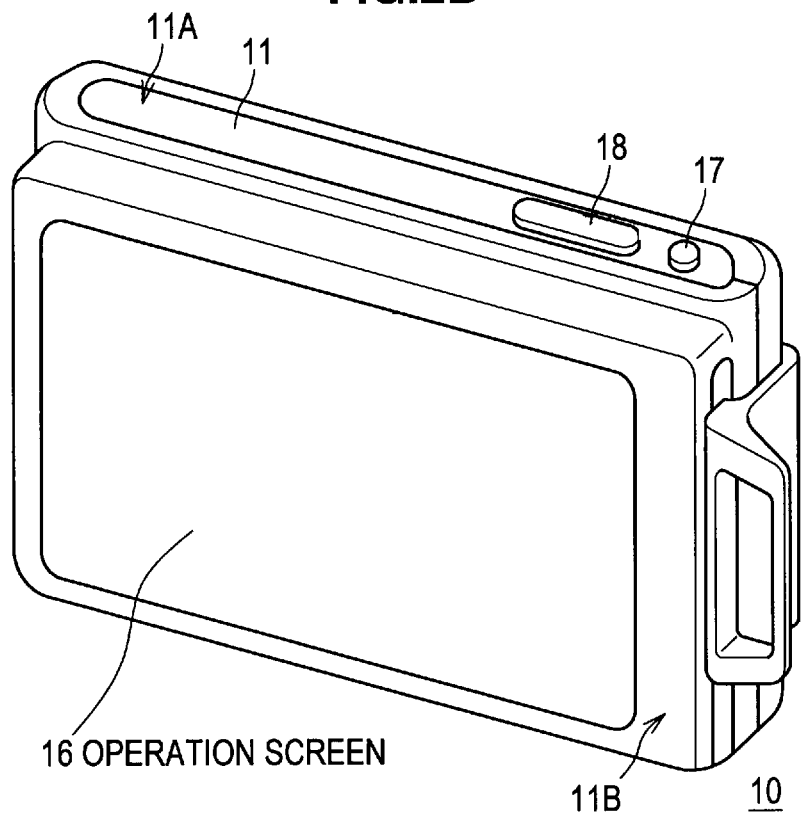

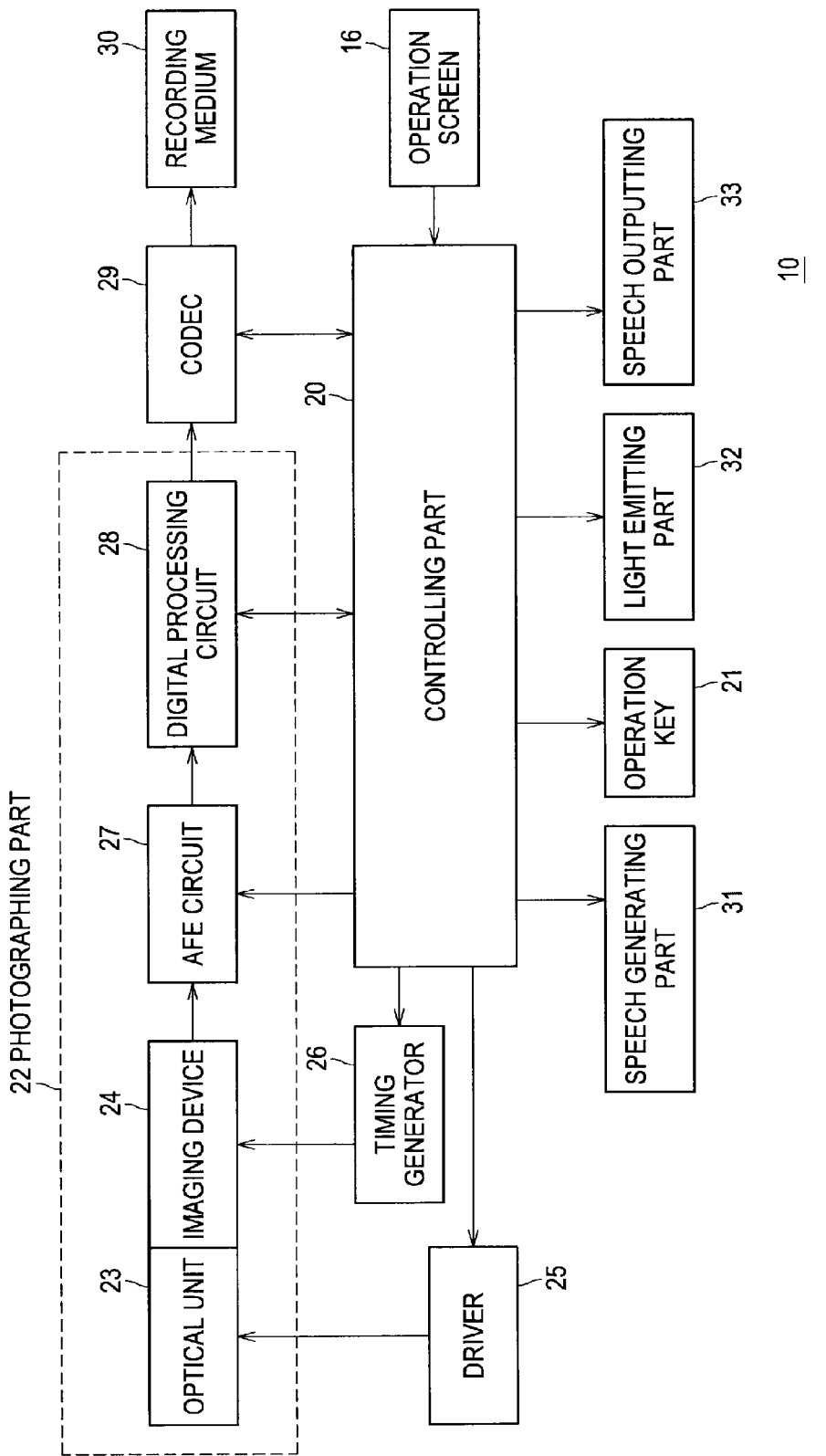

STRUCTURE OF OPERATION SCREEN

STRUCTURE OF COLOR FILTER AND OPTICAL SENSOR FOR EACH PIXEL

HOW INFRARED RAY REFLECTS WHEN OPERATOR IS
HELD OVER DISPLAY SURFACE OF OPERATION SCREEN

HOW INFRARED RAY REFLECTS WHEN OPERATOR IS
TOUCHED ON DISPLAY SURFACE OF OPERATION SCREEN

HOW OPTICAL SENSOR SCANS AT EACH PIXEL POSITION

FIG.10

| NUMBER OF DETECTED HELD-OVER REGIONS | | | | | | | N |
|---|---|---|---|---|---|---|---|
| REGION NUMBER | REGION'S GRAVITY CENTER POSITION | REGION AREA | REGION'S RIGHT END POSITION | REGION'S LEFT END POSITION | REGION'S UPPER END POSITION | REGION'S LOWER END POSITION | |
| REGION 1 | X1, Y1 | Area 1 | XA, YA | XB, YB | XC, YC | XD, YD | |
| ... | ... | ... | ... | ... | ... | ... | |
| REGION N | XN, YN | Area N | XE, YE | XF, YF | XG, YG | XH, YH | |

CONFIGURATION OF REGION DATA

HOW TO DETECT HELD-OVER REGION

HOW INSTRUCTION INPUT REGION IS IN PHOTOGRAPHING MODE

HOW PHOTOGRAPHING PREPARATION PROCESSING IS
IN RESPONSE TO INPUT OF PHOTOGRAPHING PREPARATION INSTRUCTION

HOW PHOTO SHOOTING PROCESSING IS
IN RESPONSE TO INPUT OF PHOTOGRAPHING INSTRUCTION

HOW ANIMATION PHOTOGRAPHING PROCESSING STARTS
IN RESPONSE TO INPUT OF RECORDING START INSTRUCTION

HOW ANIMATION PHOTOGRAPHING PROCESSING ENDS
IN RESPONSE TO INPUT OF RECORDING END INSTRUCTION

PHOTOGRAPHING CONTROL PROCESSING PROCEDURE (1)

PHOTOGRAPHING CONTROL PROCESSING PROCEDURE (3)

PHOTOGRAPHING CONTROL PROCESSING PROCEDURE (4)

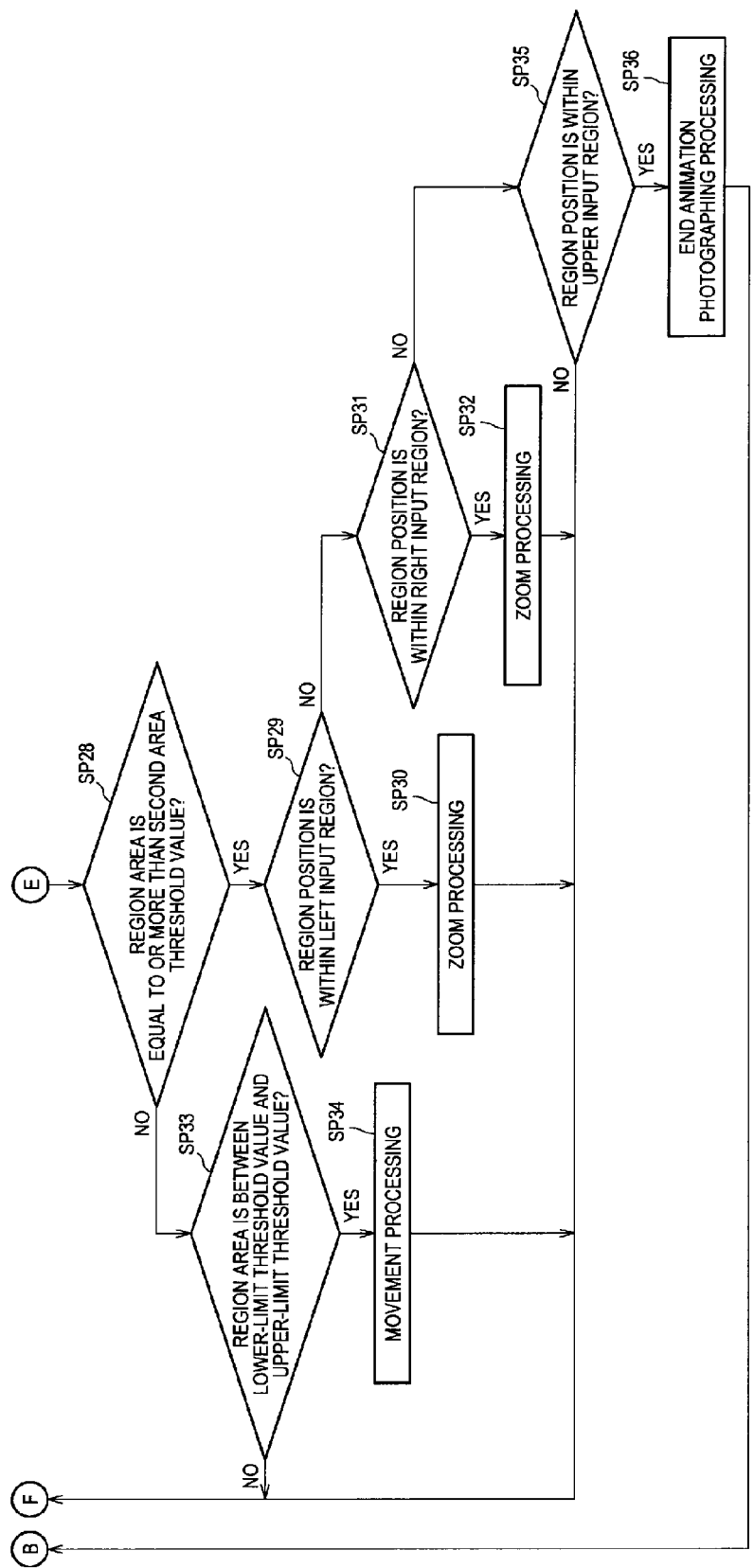

PHOTOGRAPHING APPARATUS, PHOTOGRAPHING CONTROL METHOD AND PHOTOGRAPHING CONTROL PROGRAM FOR PROVIDING ENHANCED PHOTOS AND ANIMATIONS

TECHNICAL FIELD

The present invention relates to a photographing apparatus, a photographing control method and a photographing control program, and is suitably applicable to an electronic device, a digital camera, or an electronic device including a digital camera function capable of shooting a photo of a subject and photographing an animation thereof, for example.

BACKGROUND ART

A video camera in related art is provided with various operation switches such as a photographing start/stop switch or a zoom switch on a case constituting its outer package. The video camera can select a photographing range including a subject and photograph an animation of the subject in response to the pressing operation of the operation switch (see Japanese Patent Application Laid-Open No. 2009-20759 (p. 16, FIG. 13), for example).

SUMMARY OF INVENTION

However, there is an issue, in the above-configured video camera, that when an operation switch is pressed for photographing an animation of a subject, a case is moved due to the pressing operation, which jiggles an operator's hand (that is, the photographed image is blurred).

In light of the foregoing, it is desirable to provide a photographing apparatus, a photographing control method and a photographing control program capable of preventing an operator's hand from jiggling during photographing.

According to the present invention, when an operation member is held over a surface of an operation screen, a controlling part controls the photographing of a subject by a photographing part for photographing the subject according to a held-over region of the operation member on the surface detected by the operation screen, and thus when the subject is photographed by the photographing part, the controlling part causes the photographing part to input an instruction without applying an external force for pressing an operation key, thereby controlling the photographing of the subject by the photographing part, which realizes a photographing apparatus, a photographing control method and a photographing control program capable of preventing the operator's hand's from jiggling during the photographing.

BRIEF DESCRIPTION OF DRAWINGS

FIG. 2B is a schematic diagram showing one embodiment of an outer structure of a digital camera.

FIG. 3 is a block diagram showing a circuit configuration by hardware circuit blocks of the digital camera.

FIG. 10 is a schematic diagram showing a configuration of region data.

FIG. 26 is a flowchart showing a photographing control processing procedure (5).

DESCRIPTION OF EMBODIMENTS

Figure 1:
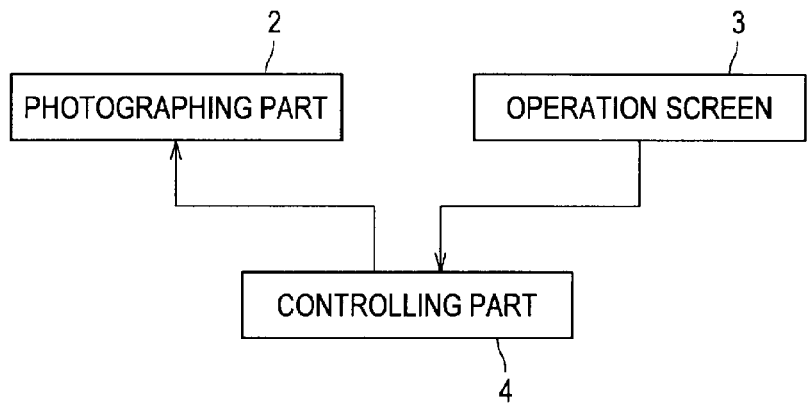
FIG. 1 is a block diagram showing one embodiment of a circuit configuration of a photographing apparatus according to the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The best modes for implementing the present invention (which will be referred to as embodiments below) will be described with reference to the drawings. The description will be made in the following order.

1. Embodiment
2. Modifications

<1. Embodiment>

(1-1 Outline of Embodiment)

The outline of the embodiment will be first described. The outline is described and then specific examples of the embodiment will be described.

In FIG. 1, numeral 1 denotes an entire photographing apparatus according to the embodiment. A photographing part 2 in the photographing apparatus 1 photographs a subject. An operation screen 3 in the photographing apparatus 1 detects a held-over region of an operation member on a surface when the operation member is held over the surface. A controlling part 4 in the photographing apparatus 1 controls the photographing of the subject by the photographing part 2 according to the held-over region detected by the operation screen 3.

With the structure, the photographing apparatus 1 can have an instruction input without applying an external force for pressing an operation key when the subject is photographed by the photographing part 2, thereby controlling the photographing of the subject by the photographing part 2. Thus, the photographing apparatus 1 can prevent an operator's hand's jiggling during the photographing.

(1-2 Outer Structure of Digital Camera)

Figure 2A:
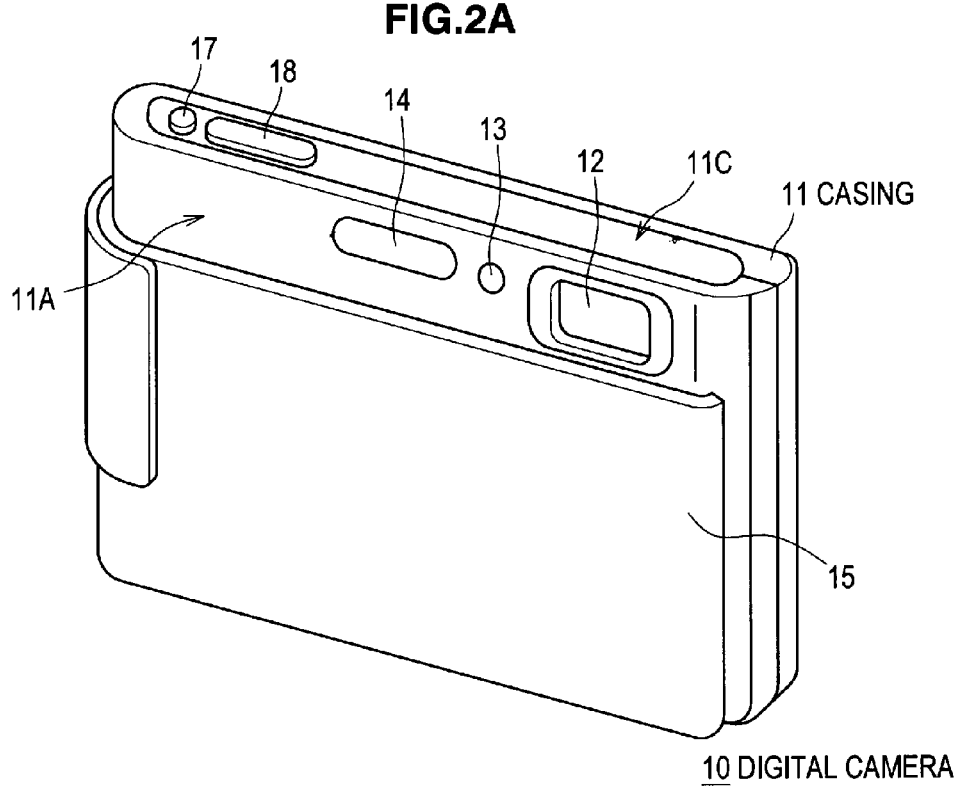
FIG. 2A is a schematic diagram showing one embodiment of an outer structure of a digital camera.

The outer structure of a digital camera 10 as a specific example of the photographing apparatus 1 will be described below with reference to FIGS. 2A and 2B. As shown in FIGS. 2A and 2B, the digital camera 10 has a substantially flat-rectangular casing 11 large enough to be grasped by one hand.

A front face 11A of the casing 11 is provided on its top with a photographing lens 12, an auto focus (AF) illuminator 13 and a flash 14. The auto focus illuminator 13 serves also as a self-timer lamp.

A lens cover 15 is attached on the front face 11A slidably in the upward direction and in the downward direction. Thus, when the lens cover 15 is slid in the downward direction, the casing 11 can expose the photographing lens 12, the auto focus illuminator 13 and the flash 14.

To the contrary, when the lens cover 15 is slid in the upward direction, the casing 11 can cover and protect the photographing lens 12, the auto focus illuminator 13 and the flash 14 from the outside. The digital camera 10 can be automatically powered on when the lens cover 15 is slid in the downward direction in the power-off state.

A rear face 11B of the casing 11 is provided with an operation screen 16. The operation screen 16 is a device having a function as an operating unit for inputting various instructions not by contacting a palm, finger or stylus pen but by holding over the same, and a function as a displaying part for displaying a photographic image or a dynamic image.

In the following description, a palm, finger or stylus pen which can be held over the display surface of the operation screen 16 for inputting an instruction will be referred to as an operation member. Further, the operation of holding an operation member over the display surface of the operation screen 16 for inputting an instruction may be referred to as a holding-over operation.

A power supply key 17 and a reproduction key 18 are arranged on a top face 11C of the casing 11. The reproduction key 18 is a hardware key for switching an operation mode of the digital camera 10 to a reproduction mode of reproducing and displaying a photographic image or dynamic image on the operation screen 16.

With the structure, when the lens cover 15 is slid in the downward direction or the power supply key 17 is pressed, the digital camera 10 is powered on and is activated in the photographing mode, for example.

The digital camera 10 generates and displays a photographing state presenting an image (that is, through image) on the operation screen 16 while continuously photographing a subject through the photographing lens 12 in the photographing mode for confirming a photographing range, a composition, and a photographing state such as focusing.

At this time, the digital camera 10 performs zooming (TELE/WIDE) according to the holding-over operation on the display surface of the operation screen 16. In this manner, the digital camera 10 can allow a user to confirm the photographing state of the subject through the photographing state presenting an image displayed on the operation screen 16.

In this state, when an instruction of photographing a subject is input through the holding-over operation on the display surface of the operation screen 16, the digital camera 10 photographs the subject through the photographing lens 12 to generate and record a photographic image.

When a recording start instruction of starting to record the continuous photographing of the subject is input through the holding-over operation on the display surface of the operation screen 16, the digital camera 10 starts to continuously photograph the subject through the photographing lens 12 and simultaneously to photograph an animation for recording the photographing.

Thereafter, until a recording end instruction of ending the recording of the photographing is input through the holding-over operation on the display surface of the operation screen 16, the digital camera 10 continuously photographs an animation of the subject to generate and record its dynamic image.

In this manner, the digital camera 10 can photograph the subject to generate and record its photographic image, and additionally photograph the animation of the subject to generate and record its dynamic image.

When the reproduction key 18 is pressed, the digital camera 10 transitions from the photographing mode to the reproduction mode. At this time, the digital camera 10 displays one of the previously recorded photographic images and dynamic images on the operation screen 16, for example. Then the digital camera 10 switches the photographic image or dynamic image to be displayed on the operation screen 16 according to the holding-over operation on the display surface of the operation screen 16.

The digital camera 10 can reproduce and present the photographic images recorded by photographing the subject or the dynamic images recorded by photographing the animation of the subject.

(1-3 Circuit Configuration of Digital Camera 10)

A circuit configuration of the digital camera 10 by hardware circuit blocks will be described below with reference to FIG. 3. As shown in FIG. 3, the digital camera 10 includes a controlling part 20 having a microprocessor structure, for example.

The controlling part 20 entirely controls the digital camera 10 according to various programs previously stored in an internal memory (not shown) and executes predetermined calculation processings. The controlling part 20 executes various processings in response to, for example, an instruction input through the holding-over operation on the display surface of the operation screen 16 or an instruction input through the operation of an operation key 21 provided on the casing 11 such as the power supply key 17 and the reproduction key 18.

When a power-on instruction is input through the operation of the power supply key, the controlling part 20 powers on the power supply and activates in the photographing mode. When a mode switching instruction of switching the reproduction mode to the photographing mode is input through the holding-over operation on the display surface of the operation screen 16 in the reproduction mode, for example, the controlling part 20 transitions from the reproduction mode to the photographing mode.

In the photographing mode, the controlling part 20 receives an imaging light arriving from the photographing range including a subject at a light receiving surface of an imaging device 24 via an optical unit 23 in a photographing part 22. The optical unit 23 is configured with a focus lens and a zoom lens as well as the photographing lens 12. The imaging device 24 is formed of a CCD (Charge Coupled Device) image sensor or a CMOS (Complementary Metal Oxide Semiconductor) image sensor.

At this time, the controlling part 20 appropriately controls to drive the optical unit 23 via a driver 25 to adjust the position of the focus lens or the opening amount of a diaphragm in the optical unit 23, thereby automatically adjusting the focus or exposure on the photographing range including the subject.

When a zoom instruction is input through the holding-over operation on the display surface of the operation screen 16, the controlling part 20 moves the zoom lens of the optical unit 23 via the driver 25 according to the zoom instruction. Thus the controlling part 20 adjusts the zoom magnification for widening or narrowing the photographing range.

In this state, the controlling part 20 controls a timing generator 26 to send a timing signal from the timing generator 26 to the imaging device 24 at a predetermined period. The imaging device 24 photoelectrically converts the imaging light received on the light receiving surface at an input timing of the timing signal to sequentially generate an analog photoelectrically-converted signal corresponding to the imaging light.

The imaging device 24 sends a generated photoelectrically-converted signal to an analog front end circuit (which will be referred to as AFE circuit below) 27 whenever the photoelectrically-converted signal is generated.

Whenever given a photoelectrically-converted signal from the imaging device 24, the AFE circuit 27 performs a predetermined analog processing such as amplification processing or noise reduction processing on the photoelectrically-converted signal to generate an analog imaging signal. Whenever generating an imaging signal, the AFE circuit 27 performs the analog/digital conversion processing on the generated imaging signal and sends the obtained signal as digital imaging data to a digital processing circuit 28.

Whenever given the imaging data from the AFE circuit 27, the digital processing circuit 28 performs, on the imaging data, a shading correction processing or a digital processing for presenting the photographing state such as image downsize processing for thinning out the pixels for a display resolution of the operation screen 16. The digital processing for presenting the photographing state will be referred to as the state presentation digital processing in the following description.

The digital processing circuit 28 generates, based on the imaging data sequentially given from the AFE circuit 27, the state presenting unit image data of multiple temporally-continuous state presenting unit images which constitute the photographing state presenting image.

The digital processing circuit 28 sequentially generates the state presenting unit image data based on the imaging data and further sends the data string of the generated state presenting unit image data as the photographing state presenting image data to the controlling part 20.

At this time, the controlling part 20 sends the photographing state presenting image data given from the digital processing circuit 28 to the operation screen 16. Thus the controlling part 20 displays the photographing state presenting image based on the photographing state presenting image data on the operation screen 16 (that is, sequentially switches the state presenting unit image based on the state presenting unit image data and displays it as the photographing state presenting image).

The controlling part 20 can allow a user to confirm the photographing range, composition and subject's photographing state such as focusing by the photographing state presenting image displayed on the operation screen 16.

The controlling part 20 combines the image data such as of icons indicating the use state of the digital camera 10 such as a remaining amount of battery (not shown) incorporated in the digital camera or a photographing condition with the photographing state presenting image data.

Thus the controlling part 20 can display the icons over the photographing state presenting image displayed on the operation screen 16 and can notify the use state of the digital camera 10 such as the battery's remaining amount or the photographing condition selected at this time by the icons.

In this state, when a photographing instruction is input through the holding-over operation on the display surface of the operation screen 16, the controlling part 20 controls the photographing part 22 or a codec 29 for photo shooting in response to an input of the photographing instruction.

The controlling part 20 controls the timing generator 26 to expose the light receiving surface of the imaging device 24 by an imaging light at a predetermined shutter speed for photo shooting. Thus the imaging device 24 photoelectrically converts the imaging light exposing the light receiving surface to generate a photoelectrically-converted signal corresponding to the exposed imaging light and to send the generated photoelectrically-converted signal to the AFE circuit 27.

The AFE circuit 27 performs the analog processing on the photoelectrically-converted signal given from the imaging device 24 to generate an imaging signal, and performs the analog/digital conversion processing on the generated imaging signal to send it as the imaging data to the digital processing circuit 28.

The digital processing circuit 28 performs, on the imaging data given from the AFE circuit 27, a shading correction processing or a digital processing for photo shooting such as image downsize processing for thinning out the pixels according to the image size previously selected for photographic image. The digital processing for photo shooting will be referred to as photo shooting digital processing in the following description.

The digital processing circuit 28 generates, based on the imaging data given from the AFE circuit 27, the photographic image data obtained by photographing the photographing range including a subject, and sends the generated photographic image data to the codec 29.

When given the photographic image data from the digital processing circuit 28, the codec 29 performs a compression encoding processing on the photographic image data in a predetermined compression encoding system such as JPEG (Joint Photographic Experts Group) to generate compressed photographic image data.

The codec 29 performs the downsize processing for thinning out the pixels on the photographic image data to generate the downsized photographic image data of the downsized photographic image. The downsized photographic image will be referred to as a photographic thumbnail and the downsized photographic image data will be referred to as photographic thumbnail data in the following description.

The codec 29 sends the compressed photographic image data together with the photographic thumbnail data to a recording medium 30. Thus the codec 29 records the compressed photographic image data and the photographic thumbnail data in the recording medium 30 in an associated manner. In this manner, the controlling part 20 can photograph a subject and record the resultant photographic image data.

When a recording start instruction is input through the holding-over operation on the display surface of the operation screen 16, the controlling part 20 accordingly starts the animation photographing. Then, when a recording end instruction is input through the holding-over operation on the display surface of the operation screen 16, the controlling part 20 accordingly ends the animation photographing.

Until the recording end instruction is input in the photographing mode after the recording start instruction is input, the controlling part 20 controls the digital processing circuit 28 and the codec 29 for animation photographing of the subject.

At this time, the controlling part 20 controls the timing generator 26 and sends the timing signal at a predetermined period from the timing generator 26 to the imaging device 24. Thus, the imaging device 24 photoelectrically converts the imaging light received on the light receiving surface at the input timing of the timing signal, and sequentially generates and sends the photoelectrically-converted signal corresponding to the imaging light to the AFE circuit 27.

Whenever given the photoelectrically-converted signal from the imaging device 24, the AFE circuit 27 performs the analog processing on the photoelectrically-converted signal to generate the imaging signal, and performs the analog/digital conversion processing on the generated imaging signal to send it as the imaging data to the digital processing circuit 28.

Whenever given the imaging data from the AFE circuit 27, the digital processing circuit 28 performs, on the imaging data, the shading correction processing or a digital processing for animation photographing such as image downsize processing for thinning out the pixels according to the image size previously selected for dynamic image. The digital processing for animation photographing will be referred to as animation photographing digital processing in the following description.

The digital processing circuit 28 generates, based on the imaging data sequentially given from the AFE circuit 27, the unit dynamic image data of the unit dynamic images such as multiple temporally-continuous frames or fields which constitute a dynamic image.

The digital processing circuit 28 sequentially generates the unit dynamic image data based on the imaging data and simultaneously sends the data string of the generated unit dynamic image data as the dynamic image data to the codec 29.

The digital camera 10 is provided with a speech generating part 31 including a microphone provided in the digital camera 10. The speech generating part 31 collects speech around the digital camera 10 via the microphone and generates an analog speech signal during the animation photographing of the subject.

The speech generating part 31 performs the amplification processing and the analog/digital conversion processing on the speech signal to generate and send digital speech data to the controlling part 20. When given the speech data from the speech generating part 31, the controlling part 20 sends the speech data to the codec 29.

The codec 29 performs, on the dynamic image data given from the digital processing circuit 28, the compression encoding processing in a predetermined compression encoding system such as MPEG (Moving Picture Experts Group) to generate compressed dynamic image data.

The codec 29 performs, on the speech data given from the controlling part 20, the compression encoding processing in a predetermined compression encoding system such as MEPG system to generate the compressed speech data. The codec 29 generates the compressed dynamic image data and the compressed speech data and simultaneously performs time division multiplexing on these items of data for each predetermined unit to generate multiplexed data (which will be referred to as video data below).

The codec 29 performs the downsize processing for thinning out the pixels on the leading unit dynamic image data among multiple items of unit dynamic image data constituting the dynamic image data, thereby generating the downsized unit dynamic image data of the downsized unit dynamic image. The downsized unit dynamic image will be referred to as animation thumbnail and the downsized unit dynamic image data will be referred to as animation thumbnail data in the following description.

The codec 29 sends the video data together with the animation thumbnail data to the recording medium 30. Thus the codec 29 records the video data and the animation thumbnail data in the recording medium 30 in an associated manner. The controlling part 20 photographs the animation of the subject and can record the resultant dynamic image data as video data.

When a zoom instruction is input through the holding-over operation on the display surface of the operation screen 16, the controlling part 20 moves the zoom lens of the optical unit 23 via the driver 25 in response to the zoom instruction, thereby widening or narrowing the photographing range.

In photographing the animation of the subject, the digital camera 10 may be changed in its orientation (that is, the orientation of the photographing lens 12) by the user to follow the moving subject.

The digital processing circuit 28 performs the animation photographing digital processing on the imaging data given from the AFE circuit 27 to generate the unit dynamic image data, and on the other hand, performs the state presenting digital processing on the imaging data to generate the state presenting unit image data during the animation photographing.

The digital processing circuit 28 sends the data string of multiple items of unit dynamic image data as the dynamic image data to the codec 29, and on the other hand, sends the data string of multiple items of state presenting unit image data as the photographing state presenting image data to the controlling part 20.

The controlling part 20 sends the photographing state presenting image data given from the digital processing circuit 28 to the operation screen 16 and displays the photographing state presenting image on the operation screen 16 during the animation photographing.

The controlling part 20 can allow the user to confirm the photographing range, composition, and subject's photographing state such as focusing through the photographing state presenting image displayed on the operation screen 16 also during the animation photographing of the subject.

The controlling part 20 combines the photographing state presenting image data with the image data of icons indicating the use state of the digital camera 10 such as the battery's remaining amount, the photographing condition and the remaining capacity of the recording medium 30. The controlling part 20 combines the photographing state presenting image data with text data of a text indicating the animation photographing state such as photographing recording time (elapsed time of animation photographing).

Thus, the controlling part 20 can display the icon or text (character string) over the photographing state presenting image displayed on the operation screen 16 and can notify the use state of the digital camera 10 or the state of the animation photographing through the icon or text.

When a photographing instruction is input through the holding-over operation on the display surface of the operation screen 16 during the animation photographing of the subject, the controlling part 20 controls the digital processing circuit 28 and the codec 29 for photographing the animation of the subject and simultaneously controls the same also for the photo shooting in response to the input of the photographing instruction.

At this time, the digital processing circuit 28 performs the animation photographing digital processing and the photo shooting digital processing on one item of imaging data given from the AFE circuit 27 when the photographing instruction is input.

The digital processing circuit 28 thus generates unit dynamic image data and photographic image data based on the one item of imaging data given from the AFE circuit 27 when the photographing instruction is input.

When the unit dynamic image data and the photographic image data are generated based on the imaging data in the above manner, the digital processing circuit 28 sends the unit dynamic image data as part of the dynamic image data to the codec 29 and additionally sends the photographic image data to the codec 29.

Thus, the codec 29 similarly generates the compressed photographic image data and the photographic thumbnail data based on the photographic image data while generating the video data according to the animation photographing of the subject.

The codec 29 sends the compressed photographic image data together with the photographic thumbnail data to the recording medium 30 and records the compressed photographic image data and the photographic thumbnail data in the recording medium 30 in an associated manner. The controlling part 20 can photograph the subject and record the resultant photographic image data also during the animation photographing of the subject.

The controlling part 20 appropriately controls a light emitting part 32 having the auto focus illuminator 13 and the flash 14 to emit light during the photo shooting or animation photographing, thereby notifying the automatic adjustment of the focusing and illuminating the subject for photographing.

On the other hand, when the reproduction key 18 is operated by the user in the photographing mode and the mode switching instruction is input, the controlling part 20 transitions from the photographing mode to the reproduction mode in response to the input of the mode switching instruction.

The controlling part 20 reads all of the photographic thumbnail data and the animation thumbnail data from the recording medium 30 via the codec 29, for example, and sends the same to the operation screen 16 in the reproduction mode. Thus the controlling part 20 displays the photographic thumbnail based on the photographic thumbnail data and the animation thumbnail based on the animation thumbnail data on the operation screen 16 in one list.

In this state, when the photographic thumbnail is selected for reproduction, for example, through the holding-over operation on the display surface of the operation screen 16, the controlling part 20 causes the codec 29 to read the compressed photographic image data corresponding to the selected photographic thumbnail from the recording medium 30.

At this time, the codec 29 expands and decodes the compressed photographic image data to generate the original photographic image data, and performs, on the photographic image data, the image downsize processing for thinning out the pixels according to the display resolution of the operation screen 16 to generate and send the photographic image data for display to the controlling part 20.

When given the photographic image data for display from the codec 29, the controlling part 20 sends the photographic image data to the operation screen 16 thereby to display the photographic image based on the photographic image data on the operation screen 16. The controlling part 20 can present the photographic image recorded by photographing the subject.

When the animation thumbnail is selected for reproduction through the holding-over operation on the display surface of the operation screen 16, for example, the controlling part 20 causes the codec 29 to read the video data corresponding to the selected animation thumbnail from the recording medium 30.

At this time, the codec 29 separates the video data into the compressed dynamic image data and the compressed speech data. The codec 29 expands and decodes the compressed dynamic image data to generate the original dynamic image data.

The codec 29 performs, on the respective items of unit dynamic image data constituting the dynamic image data, the image downsize processing for thinning out the pixels according to the display resolution of the operation screen 16, thereby generating the dynamic image data for display.

The codec 29 expands and decodes the compressed speech data to generate the original speech data. Then the codec 29 sends the dynamic image data and the speech data to the controlling part 20.

When given the dynamic image data for display together with the speech data from the codec 29, the controlling part 20 sends the dynamic image data to the operation screen 16 and additionally sends the speech data to a speech outputting part 33 including a speaker provided in the digital camera 10.

The controlling part 20 causes the operation screen 16 to display the dynamic image based on the dynamic image data and causes the speech outputting part 33 to output the speech based on the speech data in synchronization with the display. The controlling part 20 can present the dynamic image recorded by photographing the animation of the subject together with the surrounding speech recorded at the same time.

(1-4 Structure of Operation Screen)

Figure 4:
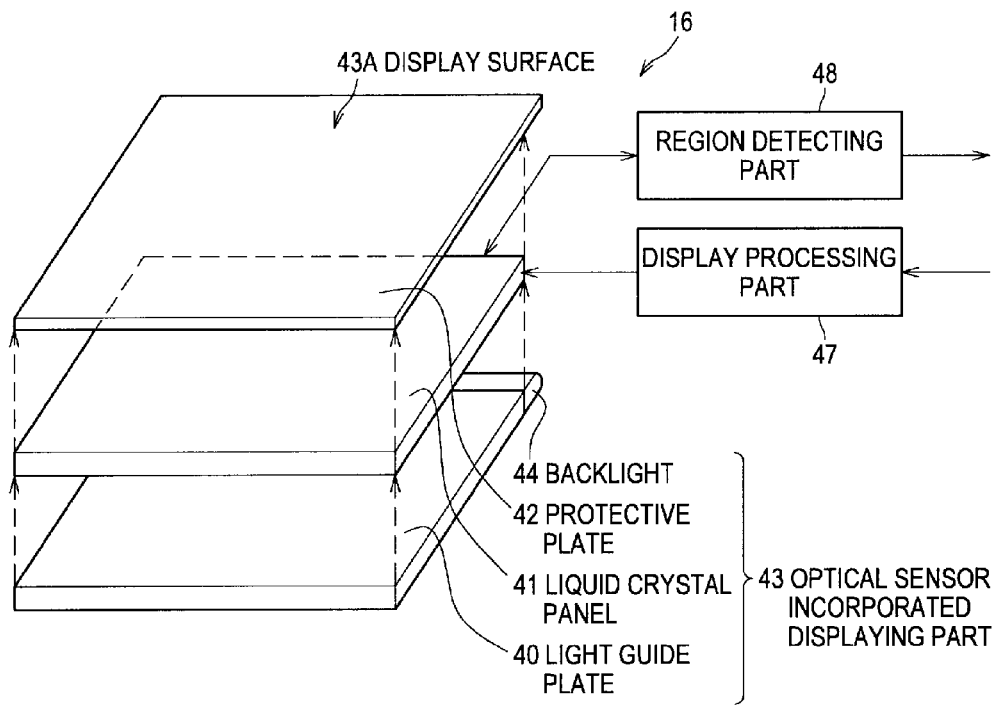
FIG. 4 is a schematic diagram showing a structure of an operation screen.

A structure of the operation screen 16 will be described below with reference to FIG. 4. As shown in FIG. 4, the operation screen 16 includes an optical sensor incorporated displaying part 43 in which a light guide plate 40, a liquid crystal panel 41 and a transparent light-transmissive protective plate 42, which are formed to be rectangular, are sequentially stacked, and the entire thickness of which is remarkably thin.

The optical sensor incorporated displaying part 43 is provided at one end of the light guide plate 40 with a backlight 44 for emitting a visible ray or infrared ray as an illuminating ray. The optical sensor incorporated displaying part 43 causes the digital camera 10 (FIG. 2) to expose the surface of the protective plate 42 as a display surface 43A from the rear face 11B of the casing 11 and houses the light guide plate 40 and the liquid crystal panel 41 in the casing 11 together with the backlight 44.

The liquid crystal panel 41 has a liquid crystal layer which is formed by encapsulating liquid crystal between the two rectangular transparent substrates. The liquid crystal panel 41 is where a color filter substrate and, for example, a vertical polarization filter are sequentially stacked on the surface of the liquid crystal layer (in the direction of the protective plate 42). The liquid crystal panel 41 is where an electrode substrate and, for example, a horizontal polarization filter are sequentially stacked in the rear face of the liquid crystal layer (in the direction of the light guide plate 40).

The electrode substrate is formed in such a manner that multiple transparent electrodes corresponding to the pixel positions of multiple arrayed pixels are arranged on the rectangular transparent material. The color filter substrate is formed in such a manner that multiple transparent electrodes corresponding to the respective pixel positions are arranged on the rectangular transparent material.

Figure 5:
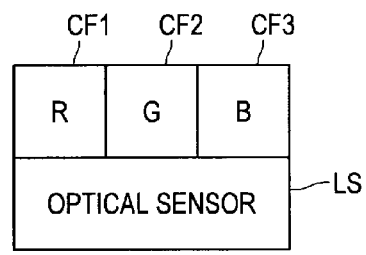
FIG. 5 is a schematic diagram showing a structure of a color filter and an optical sensor for each pixel.

The color filter substrate is formed in such a manner that the color filters CF1 to CF3 of three colors (red, green and blue) as shown in FIG. 5 and a transparent optical sensor LS for receiving an infrared ray are arranged in correspondence to the respective pixel positions on the material.

The operation screen 16 (FIG. 4) includes a display processing part 47 and a region detecting part 48 as circuit devices incorporated in the digital camera 10. The display processing part 47 is electrically connected to each transparent electrode of the electrode substrate and the color filter substrate. The region detecting part 48 is electrically connected to each optical sensor LS of the color filter substrate.

With the structure, when a light emitting power is supplied from the power supply block having the battery or the controlling part 20 to the backlight 44 for displaying an image, the operation screen 16 causes the backlight 44 to emit light by the light emitting power.

Thus the operation screen 16 illuminates the illuminating light obtained by the emission of the backlight 44 onto the entire rear face of the liquid crystal panel 41 via the light guide plate 40 and transmits it to the liquid crystal panel 41.

The operation screen 16 fetches the display image data such as the photographing state presenting image data, the photographic image data and the dynamic image data which are given from the controlling part 20 into the display processing part 47. The display processing part 47 applies a voltage, based on the display image data, to liquid crystal molecules at each pixel position of the liquid crystal layer via the transparent electrodes of the electrode substrate and the color filter substrate in the liquid crystal panel 41.

Thus, the operation screen 16 controls the orientation of the liquid crystal molecules at each pixel position of the liquid crystal layer and changes the deviation of the illuminating light through the positions of the liquid crystal molecules (transmitting from the rear face of the liquid crystal layer to the top face thereof).

The operation screen 16 colors the illuminating light transmitting the position of each liquid crystal molecule of the liquid crystal layer through the color filters CF1 to CF3, and selectively transmits the colored illuminating light as a light for display into the protective plate 42 through the polarization filter inside the liquid crystal panel 41. The light for display which is generated in the liquid crystal panel 41 will be referred to as display light in the following description.

The operation screen 16 can cause the liquid crystal molecules at each pixel position in the liquid crystal layer to function as the pixels of the image together with the polarization filer and the color filters CF1 to CF3, and can display the photographing state presenting image on the optical sensor incorporated displaying part 43.

The display light for displaying the photographing state presenting image on the optical sensor incorporated displaying part 43 is generated from the illuminating light emitted by the backlight 44 and consequently includes a visible ray and an infrared ray.

Figure 6:
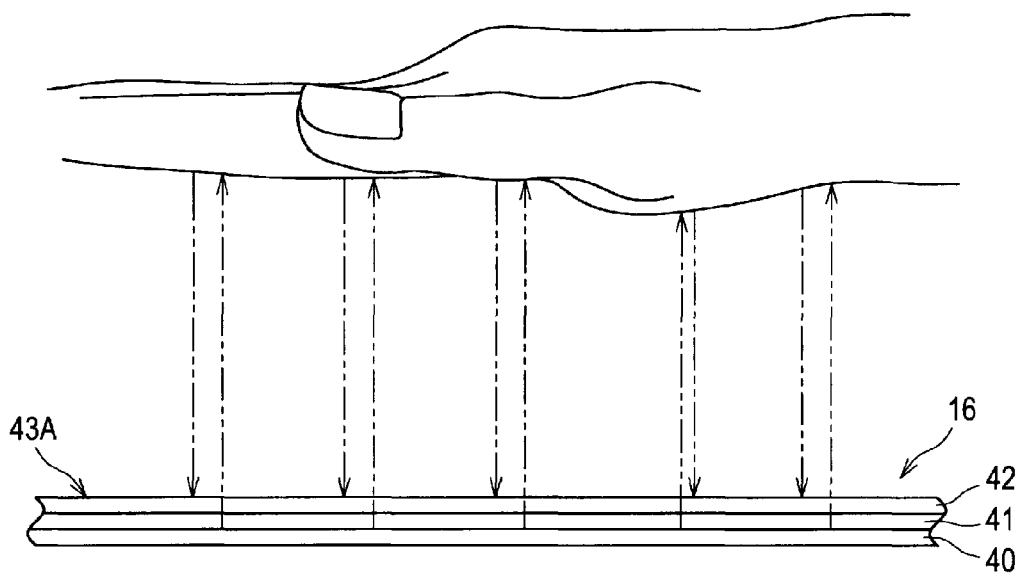
FIG. 6 is a schematic diagram for explaining infrared reflection when an operation member is held over a display surface of the operation screen.

As shown in FIG. 6, the infrared ray contained in the display light substantially perpendicularly transmits from the rear face of the protective plate 42 to the top face thereof and is emitted from the entire display surface 43A (or the top face of the protective plate 42) to the outside of the digital camera 10. The infrared ray contained in the display light and emitted to the outside of the digital camera 10 will be referred to as an emitted infrared ray in the following description.

When a hand, finger, stylus held by an operator, or other operation member is held over the display surface 43A, the emitted infrared ray is reflected on the surface of the operation member and returns to the display surface 43A. The emitted infrared ray reflected on the surface of the operation member and returning to the display surface 43A will be referred to as a reflected infrared ray in the following description.

When the emitted infrared ray is reflected on the surface of the operation member held over the display surface 43A, the operation screen 16 transmits and fetches the reflected infrared ray obtained by the reflection through the protective plate 42 and receives the same at the optical sensors LS.

The operation screen 16 detects, based on the light reception result of the reflected infrared ray by the optical sensors LS, the region hidden behind the operation member on the display surface 43A (that is, the region in which the part hidden behind the operation member is projected on the display surface 43A) as a held-over region for instruction input.

The emitted infrared ray to be emitted from the display surface 43A decreases in its light amount as being away from the display surface 43A. For the reflected infrared ray obtained at the surface of the operation member, as the display surface 43A is closer to the surface of the operation member, the attenuation in the light amount is small at the display surface 43A, and as the display surface 43A is more distant from the surface of the operation member, the attenuation in the light amount is larger at the display surface 43A.

The operation member may be held over the display surface 43A substantially in parallel or obliquely. When the operation member is a user's hand (palm or finger), its surface is undulating due to joint, fingerprint, wrinkle, or partial difference in flesh. Particularly, when the operation member is a user's hand (palm or finger), its end is rounded.

Thus, when illuminated on the surface of the operation member, part of the emitted infrared ray is reflected (or reflected immediately downward) to reversely route the emitting path and returns to the display surface 43A, and other part thereof is obliquely reflected to be spread around the operation member due to the shape of the end of the operator's hand and returns to the display surface 43A.

However, for the part of the emitted infrared ray reflected by being spread around the operation member, as the operation member is closer to the display surface 43A, the distance between the reflection position on the surface of the operation member and the display surface 43A is shorter.

Consequently, for the part of the emitted infrared ray reflected to be spread around the operation member, the attenuation in the light amount is remarkably reduced, and the part is received as the reflected infrared ray by the optical sensor LS closest to and immediately downward of the operation member.

As the operation member is closer to the display surface 43A by the holding-over operation, the operation screen 16 can detect the region hidden behind the operation member on the display surface 43A as the held-over region.

For the part of the emitted infrared ray reflected to be spread around the operation member, as the operation member is more distant from the display surface 43A, the distance between the reflection position on the surface of the operation member and the display surface 43A is longer, or the part advances around the display surface 43A and the attenuation in the light amount is larger.

The held-over region detected by the operation screen 16 is smaller than the actual region hidden behind the operation member on the display surface 43A as the operation member is more distant from the display surface 43A.

In the operation screen 16, even when the emitted infrared ray is reflected on the surface of the operation member distant from the display surface 43A by about several tens of (cm), for example, the light amount of illuminating light as the source of the emitted infrared ray is selected such that a certain amount of reflected infrared ray can be received by the optical sensor LS.

When the operation member is closer to the display surface 43A within about several tens of (cm) from the display surface 43A and is moved away therefrom, for example, the operation screen 16 can detect a change in the held-over region size depending on the operation.

When one or the other hand as the operation member is simultaneously held over the display surface 43A, for example, the operation screen 16 can detect the two regions hidden behind the one or the other hand on the display surface 43A as the held-over region, respectively.

Figure 7:
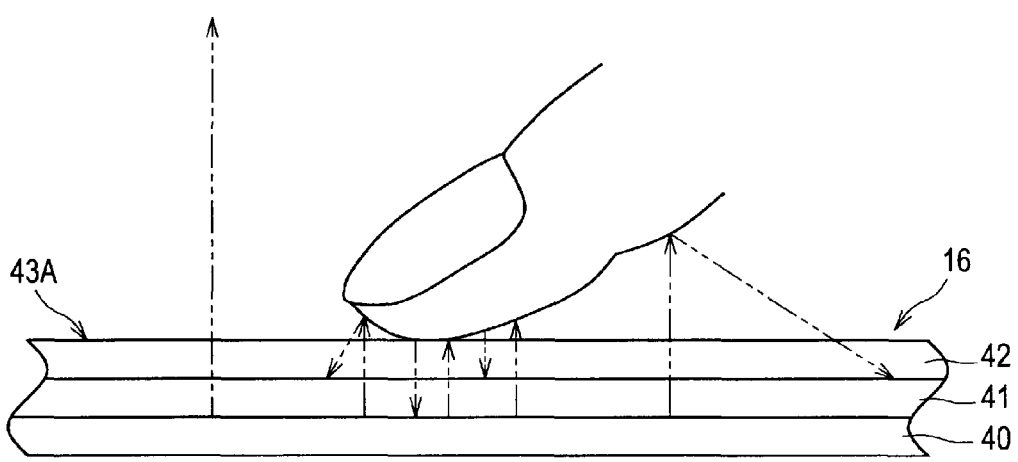
FIG. 7 is a schematic diagram for explaining infrared reflection when the display surface of the operation screen is touched by the operator.

As shown in FIG. 7, even when the operation member intended to be held over the display surface 43A contacts the display surface 43A (that is, the display surface 43A is touched by the operation member), the emitted infrared ray is reflected on the surface of the operation member and returns to the display surface 43A as the reflected infrared ray.

Even when the emitted infrared ray is reflected on the surface of the operation member contacting the display surface 43A, the operation screen 16 transmits and fetches the reflected infrared ray obtained by the reflection through the protective plate 42, and receives it by the optical sensors LS.

The operation screen 16 detects the region hidden behind the operation member contacting the display surface 43A as the held-over region for instruction input, based on the light reception result of the reflected infrared ray by the optical sensors LS.

Figure 8:
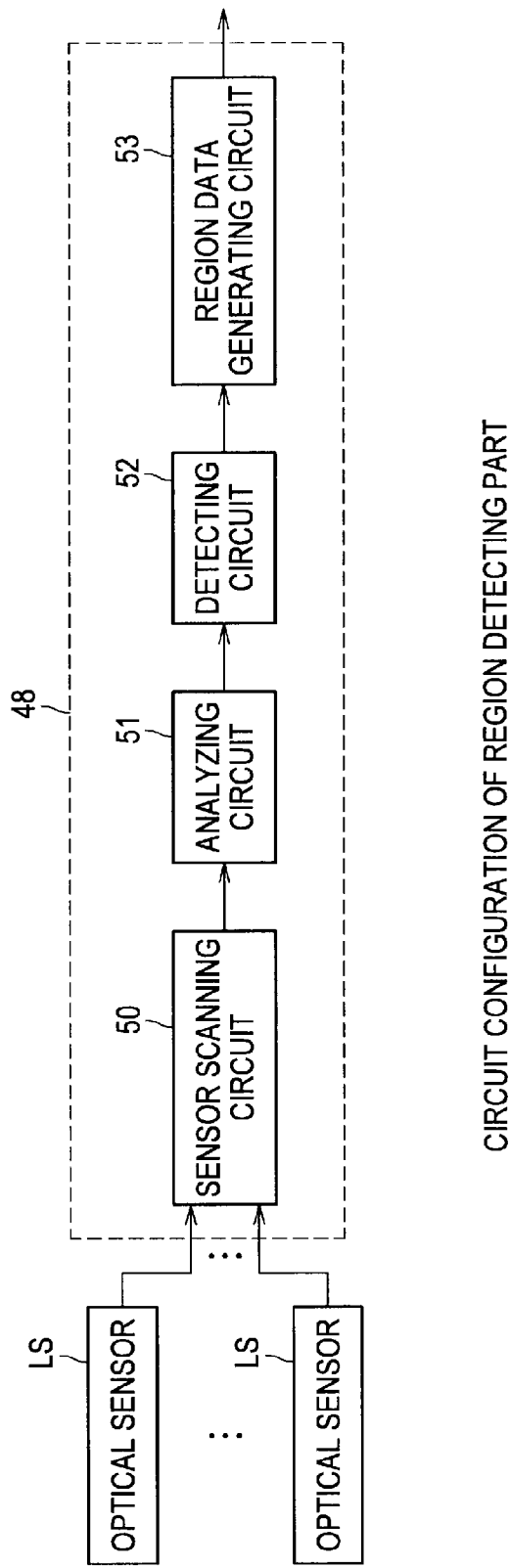
FIG. 8 is a block diagram showing a circuit configuration of a region detecting part.

As shown in FIG. 8, when receiving the reflected infrared ray, the optical sensor LS at each pixel position in the operation screen 16 actually photoelectrically converts the received reflected infrared ray and generates the analog photoelectric signal according to the light amount of the reflected infrared ray. When not receiving the reflected infrared ray, the optical sensor LS at each pixel position generates the analog photoelectric signal whose value is substantially "0".

Figure 9:
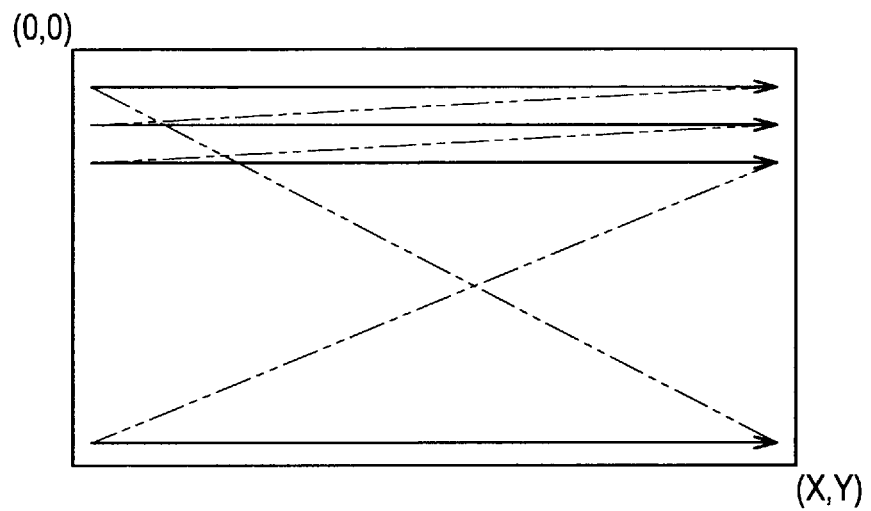
FIG. 9 is a schematic diagram for explaining the scanning of the optical sensor at each pixel position.

A sensor scanning circuit 50 in the region detecting part 48 sequentially scans the optical sensor LS at all the pixel positions as shown in FIG. 9 from the upper left corner of the display surface 43A to the lower right corner by one line, and takes the photoelectric signals from the optical sensor LS at all the pixel positions.

The sensor scanning circuit 50 repeatedly takes in the photoelectric signals from all the optical sensors LS in a predetermined remarkably short time period. The sensor scanning circuit 50 sends the photoelectric signals taken from all the optical sensors LS to an analyzing circuit 51.

Whenever given multiple photoelectric signals taken from all the optical sensors LS from the sensor scanning circuit 50, the analyzing circuit 51 analog/digital-converts the photoelectric signals and generates multiple items of digital light reception data.

The analyzing circuit 51 sequentially compares the respective values of the multiple items of light reception data with a preset threshold value. Thus, the analyzing circuit 51 generates, based on the comparison result, light reception presence data indicating whether the optical sensor LS has received the reflected infrared ray at each pixel position.

The analyzing circuit 51 detects, based on the light reception presence data at each pixel position, whether the region where the optical sensors LS receiving the reflected infrared ray inside the display surface 43A are gathered (the region where the pixel positions at which the optical sensors LS receiving the reflected infrared ray are arranged are adjacently gathered) is present. The region where the optical sensors LS receiving the reflected infrared ray inside the display surface 43A are gathered will be referred to as light receiving region in the following description.

Consequently, when one or multiple light receiving regions are detected within the display surface 43A, the analyzing circuit 51 generates the light receiving region data indicated by the coordinate of the pixel position and sends the detected light receiving region to a detecting circuit 52. When no light receiving region is detected within the display surface 43A, the analyzing circuit 51 sends nothing to the detecting circuit 51.

When given the light receiving region data from the analyzing circuit 51, the detecting circuit 52 detects the number of light receiving regions indicated by the light receiving region data. Consequently, if one or more light receiving regions are detected, the detecting circuit 52 assumes the light receiving region as the held-over region for instruction input.

At this time, the detecting circuit 52 detects the area of the held-over region (referred to as region area below) as the number of pixels positioned within the held-over region. The detecting circuit 52 detects the position of the gravity center (referred to as region's gravity center position below) of the held-over region as the coordinate of the pixel position.

The detecting circuit 52 detects the position at the right end and the position at the left end in the horizontal direction of the display surface in the held-over region (that is, the rightmost position and the leftmost position in the horizontal direction of the display surface) as the coordinates of the pixel position, respectively. The position at the right end of the held-over region is referred to as region's right end position and the position at the left end of the held-over region is referred to as region's left end position.

The detecting circuit 52 detects the position at the upper end and the position at the lower end in the vertical direction of the display surface in the held-over region (that is, the uppermost position and the lowermost position in the vertical direction of the display surface) as the coordinates of the pixel position, respectively.

The position at the upper end of the held-over region is referred to as the region's upper end position and the position at the lower end of the held-over region is referred to as region's lower end position in the following description. When the region's gravity center position, the region area, the region's right end position, the region's left end position, the region's upper end position and the region's lower end position detected for the held-over region do not need to be particularly discriminated, the positions are collectively referred to as region information in the following description. When the region's gravity center position, the region's right end position, the region's left end position, the region's upper end position and the region's lower end position do not need to be particularly discriminated, the positions are collectively referred to as a region position in the following description.

The detecting circuit 52 sends the region information (the region's gravity center position, the region area, the region's right end position, the region's left end position, the region's upper end position and the region's lower end position) detected for the held-over region to a region data generating circuit 53.

When multiple light receiving regions indicated by the light receiving region data are present, the detecting circuit 52 detects the area of the light receiving regions as the number of pixels positioned within the respective light receiving regions. The detecting circuit 52 sequentially selects a smaller-area light receiving region in descending order from the largest-area light receiving region up to the preset number of detection (such as five) and assumes the same as the held-over region for instruction input.

The detecting circuit 52 detects the region positions of the individual held-over regions as described above. The detecting circuit 52 sends the region information for each held-over region (that is, the region's gravity center position, the region area (the area detected as the light receiving region in this case), the region's right end position, the region's left end position, the region's upper end position and the region's lower end position) to the region data generating circuit 53.

When given the region information on one or multiple held-over regions from the detecting circuit 52, the region data generating circuit 53 uses the region information to generate the region data indicated in FIG. 10. The region data generating circuit 53 stores the number information indicating the number of detected held-over regions in the region data, and generates and stores region identification information for identifying the detected held-over region therein.

The region data generating circuit 53 generates the region identification information as the numbers sequentially assigned to the smaller-area held-over regions in descending order from the largest-area held-over region, for example.

The region data generating circuit 53 associates the region information for each held-over region (the region's gravity center position, the region area, the region's right end position, the region's left end position, the region's upper end position and the region's lower end position) with the region identification information on the held-over region and stores the same in the region data. The region data generating circuit 53 generates the region data and then sends the generated region data to the controlling part 20.

In the digital camera 10, the operation of holding a finger (finger's side) as the operation member over the display surface 43A is employed as the holding-over operation for an instruction input, for example. The digital camera 10 employs the operation of holding the operation member over various relatively-large regions on the display surface 43A for the instruction input in addition to the operation of holding a finger over the display surface 43A as will be described below.

When multiple held-over regions have been detected, the region data generating circuit 53 stores the region information on the smaller-area held-over region in descending order from the region information on the largest-area held-over region in the region data, for example.

The region data generating circuit 53 causes the controlling part 20 to first extract the region information on the largest-area held-over region from the region data and to use it for an instruction determination processing, and further to determine the instruction input through the holding-over operation as rapidly as possible.

Figure 11:
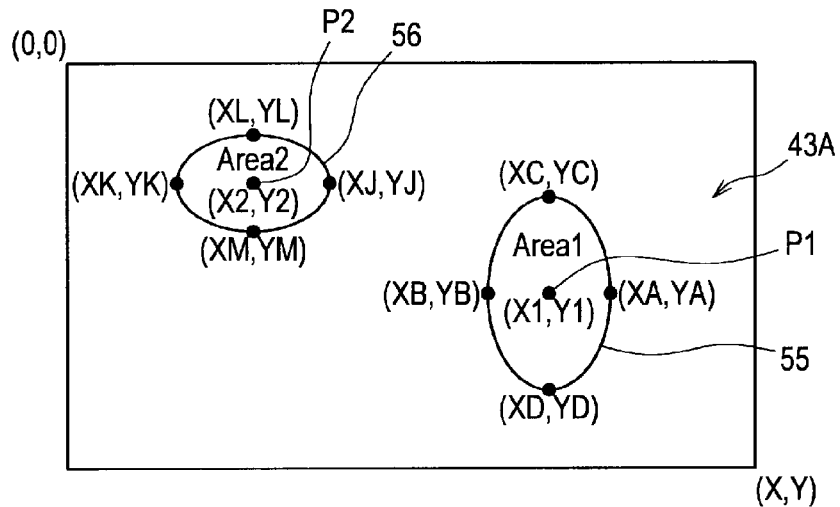
FIG. 11 is a schematic diagram for explaining the detection of a held-over region.

As shown in FIG. 11, when the holding-over operation is performed, the operation screen 16 detects one or multiple held-over regions 55 and 56 within the display surface 43A as the region information such as the region's gravity center positions P1 and P2 or the region areas Area1 and Area2, respectively.

The operation screen 16 repeatedly fetches the photoelectric signals from all the optical sensors LS in a predetermined remarkably short time period as described above. When the operation member is gradually moved closer to or away from the display surface 43A, for example, the operation screen 16 can sequentially detect the held-over region, which gradually changes in its size, as the region information.

The operation screen 16 notifies the controlling part 20 of the detection result on the held-over region as the region data, thereby causing the controlling part 20 to accurately determine the holding-over operation performed on the display surface 43A.

In other words, the operation screen 16 can cause the controlling part 20 to accurately determine which part of the display surface 43A the operation member has been held over for the instruction input or how the operation member has been held over (has been gradually moved closer to or away from the display surface 43A).

(1-5 Input Determination Processing)

There will be described below an instruction determination processing to be performed, based on the region data, by the controlling part 20 for determining an instruction input through the holding-over operation.

The controlling part 20 previously stores a data table used for determining an instruction input through the holding-over operation (referred to as determination table below) in an internal memory, for example.

The determination table is generated for each operation mode (photographing mode, reproduction mode, or menu display mode), for example. The determination table for each operation mode stores therein an instruction capable of being input in the operation mode and an input determination condition for determining that the instruction has been input in an associated manner.

Actually, the controlling part 20 indicates different menu items on the operation screen 16 (or the display surface 43A) and displays multiple icons capable of being designated through the holding-over operation by a finger or stylus pen as the operation member in the menu display mode.

The determination table for the menu display mode stores therein an instruction capable of being input by icon designation (instruction assigned to an icon display region) and input determination condition information indicating the input determination condition for determining that the instruction has been input in an associated manner.

In this case, the input determination condition information stores therein the display region information indicating the icon display region with the coordinate of the pixel position, for example. The input determination condition information stores therein the condition information indicating that the region's gravity center position is within the display region indicated by the display region information and its region area is equal to or less than the previously-selected maximum area. The maximum area is indicated by the number of pixels.

When given the region data from the operation screen 16 in the menu display mode, the controlling part 20 determines, based on the region data, the number of detected held-over regions.

When one held-over region is detected, the controlling part 20 extracts the region information indicating the held-over region from the region data. When multiple held-over regions are detected, the controlling part 20 extracts the region information indicating the one largest-area held-over region from the region data.

While reading multiple items of input determination condition information from the determination table for a menu display mode, the controlling part 20 sequentially compares the contents of the read input determination condition information with the region's gravity center position or region area contained in the region information.

Consequently, when there is the input determination condition information indicating the display region containing the region's gravity center position and indicating the largest area equal to or more than the region area, the controlling part 20 determines that the instruction corresponding to the input determination condition information has been input through the holding-over operation.

When determining the instruction input through the holding-over operation, the controlling part 20 performs various processings such as setting of photographing conditions or setting of execution of specific processing according to the determined instruction.

To the contrary, when there is not the input determination condition information indicating a range containing the region's gravity center position and/or the maximum area value equal to or more than the region area, the controlling part 20 determines that no instruction has been input. The controlling part 20 determines the instruction input by the icon designation through the holding-over operation.

Figure 12:
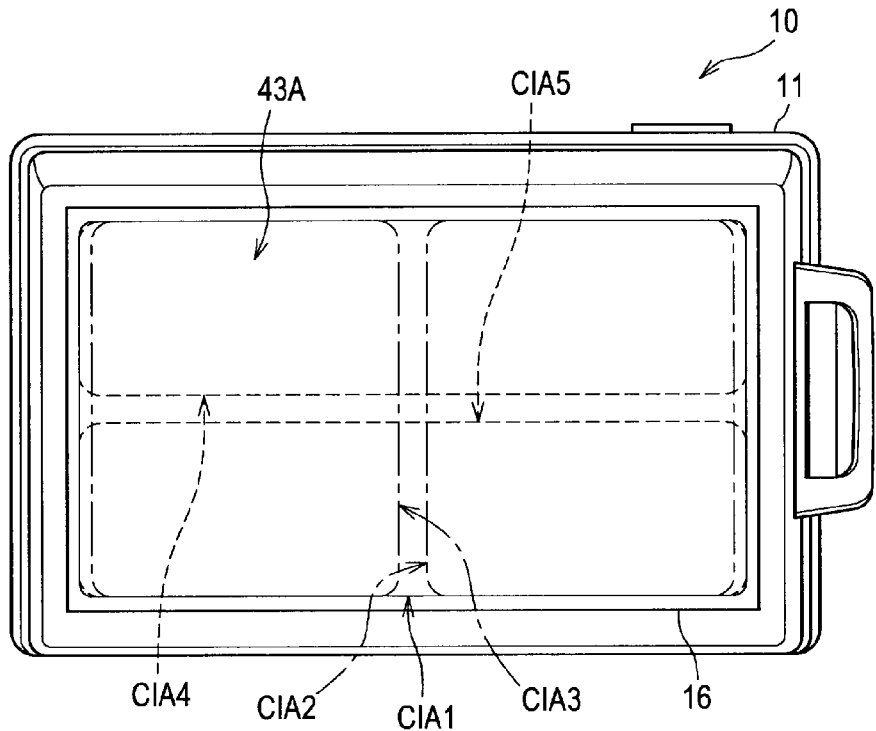
FIG. 12 is a schematic diagram for explaining an instruction input region in a photographing mode.

As shown in FIG. 12, for the digital camera 10, the entire display surface 43A is set in an instruction input region CIA1 as the instruction input region for inputting an instruction through the holding-over operation in the photographing mode.

For the digital camera 10, the right half and the left half of the display surface 43A in the horizontal direction are set in the instruction input regions CIA2 and CIA3, respectively, as the instruction input region for inputting an instruction through the holding-over operation in the photographing mode.

For the digital camera 10, the upper half and the lower half of the display surface 43A in the vertical direction are set in the instruction input regions CIA4 and CIA5, respectively, as the instruction input region for inputting an instruction through the holding-over operation in the photographing mode.

The instruction input region CIA1 made of the entire display surface 43A in the photographing mode is referred to as the full-face input region CIA 1 in the following description. The instruction input region CIA2 made of the right half of the display surface 43A in the photographing mode is referred to as the right input region CIA2, and the instruction input region CIA3 made of the left half of the display surface 43A is referred to as the left input region CIA3.

Further, in the following description, the instruction input region CIA4 made of the upper half of the display surface 43A in the photographing mode is referred to as the upper input region CIA4 and the instruction input region CIA5 made of the lower half of the display surface 43A is referred to as the lower input region CIA5.

For the digital camera 10, a photographing instruction for photo shooting is assigned, as an instruction capable of being input in the photographing mode, to the full-face input region CIA1. Further, for the digital camera 10, a zoom instruction for widening the photographing range is assigned, as an instruction capable of being input in the photographing mode, to the right input region CIA2, for example.

For the digital camera 10, a zoom instruction for narrowing the photographing range is assigned, as an instruction capable of being input in the photographing mode, to the left input region CIA3, for example. The zoom instruction for widening the photographing range will be referred to as zoom-out instruction and the zoom instruction for narrowing the photographing range will be referred to as zoom-in instruction in the following description.

For the digital camera 10, a recording start instruction for animation photographing is assigned to the upper input region CIA4 and a recording end instruction for animation photographing is assigned to the lower input region CIA5 as the instructions capable of being input in the photographing mode, for example.

The determination table for a photographing mode stores therein the instructions assigned to the instruction input regions and the input determination condition information indicating the input determination conditions for determining that the instructions have been input in an associated manner.

The input determination condition information associated with the photographing instruction stores therein the condition information indicating that the region area is equal to or more than a preset first area threshold value. The input determination condition information associated with the photographing instruction stores therein the input presence information indicating that the input of the photographing instruction is valid as the initial state over the photographing mode.

The first area threshold value is indicated by the number of pixels and is selected according to the area of the full-face input region CIA1 so as to detect that the operation member has been held over substantially the entire display surface 43A.

The input determination condition information associated with the zoom-out instruction stores therein the display region information indicating the right input region CIA2 with the coordinate of the pixel position, for example. The input determination condition information stores therein the condition information indicating that the region position (the region's gravity center position, the region's right end position, the region's left end position, the region's upper end position or the region's lower end position) is within the right input region CIA2 and its region area is equal to or more than a preset second area threshold value, for example.

The input determination condition information associated with the zoom-out instruction stores therein the input presence information indicating that the input of the zoom-out instruction is valid as the initial state over the photographing mode.

The second area threshold value is indicated by the number of pixels and is selected according to the area as substantially half as the entire display surface 43A so as to detect that the operation member has been held over substantially half of the display surface 43A.

The input determination condition information associated with the zoom-in instruction stores therein the display region information indicating the left input region CIA3 with the coordinate of the pixel position, for example. The input determination condition information associated with the zoom-in instruction stores therein the condition information indicating that the region position is within the left input region CIA3 and its region area is equal to or more than the second area threshold value, for example.

The input determination condition information associated with the zoom-in instruction stores therein the input presence information indicating that the input of the zoom-in instruction is valid as the initial state over the photographing mode.

The input determination condition information associated with the recording start instruction stores therein the display region information indicating the upper input region CIA4 with the coordinate of the pixel position. The input determination condition information associated with the recording start instruction stores therein the condition information indicating that the region position is within the upper input region CIA4 and its region area is equal to or more than the second area threshold value, for example.

The input determination condition information associated with the recording end instruction stores therein the display region information indicating the lower input region CIA5 with the coordinate of the pixel position, for example. The input determination condition information associated with the recording end instruction stores therein the condition information indicating that the region position is within the lower input region CIA5 and its region area is equal to or more than the second area threshold value, for example.

For the digital camera 10, the instructions capable of being input in the photographing mode include a photographing preparation instruction of conforming the focus or exposure to the position (such as the region's gravity center position) designated through the holding-over operation and preparing the photo shooting, for example.

The determination table for the photographing mode stores therein the photographing preparation instruction and the input determination condition information indicating the input determination condition for determining that the photographing preparation instruction has been input in an associated manner.

The input determination condition information associated with the photographing preparation instruction stores therein the condition information indicating that the region area is equal to or less than a preset third area threshold value, for example. The input determination condition information associated with the photographing preparation instruction stores therein the input presence information indicating that the input of the photographing preparation instruction is valid in the photographing mode except during the animation photographing.

The third area threshold value is indicated by the number of pixels, and is selected according to an average size of the person's second finger so as to detect that a finger as the operation member is held over the display surface 43A, for example.

For the digital camera 10, the instructions capable of being input in the photographing mode include a moving instruction of moving an icon or text, which is displayed over the photographing state presenting image, indicating the use state of the digital camera 10 or the situation of the animation photographing, for example.

The determination table for the photographing mode stores therein the moving instruction and the input determination condition information indicating the input determination condition for determining that the moving instruction has been input in an associated manner.

The input determination condition information associated with the moving instruction stores therein the condition information indicating that the region area is between the preset lower-limit threshold value and the upper-limit threshold value, for example.

The upper-limit threshold value and the lower-limit threshold value indicated by the input determination condition are indicated by the number of pixels, and the lower-limit threshold value is selected to be larger than the third area threshold value and the upper-limit threshold value is selected to be smaller than the second area threshold value, for example.

For the digital camera 10, the instructions capable of being input especially during the animation photographing in the photographing mode include a fading instruction of fading out a dynamic image being recorded and fading in the same.

The determination table for photographing mode stores therein the fading instruction and the input determination condition information indicating the input determination condition for determining that the fading instruction has been input in an associated manner.

In this case, the input determination condition information associated with the fading instruction stores therein the condition information indicating that the region area of one or two held-over regions during the animation photographing is equal to or more than a present fourth area threshold value, for example.

The input determination condition information associated with the fading instruction stores therein the input presence information indicating that the input of the fading instruction is invalid as the initial state over the photographing mode. The fourth area threshold value indicated by the input determination condition is indicated by the number of pixels and is selected to be smaller than the second area threshold value, for example.

The controlling part 20 can select whether the input of the fading instruction is valid or invalid on a predetermined setting image displayed on the operation screen 16 according to the icon designation through the holding-over operation in the menu display mode, for example.

While the input of the fading instruction is invalid, when the input is selected to be valid, the controlling part 20 changes the contents of the input presence information corresponding to the fading instruction in the determination table for the photographing mode to indicate that the input is valid during the animation photographing. Thereby, the controlling part 20 sets the input of the fading instruction to be valid during the animation photographing.

Even when the input of the fading instruction is valid, if the input is selected to be invalid thereafter, the controlling part 20 changes the contents of the input presence information corresponding to the fading instruction in the determination table for the photographing mode to indicate that the input is invalid over the photographing mode. Thus, the controlling part 20 sets the input of the fading instruction to be invalid over the photographing mode.

As will be described later, the controlling part 20 inputs the fading instruction by holding the operation member over the full-face input region CIA1, the right input region CIA2 or the left input region CIA3 of the display surface 43A, for example.

In other words, the holding-over operation for inputting the fading instruction may be difficult to discriminate from the holding-over operation for inputting the photographing instruction, the zoom-out instruction or the zoom-in instruction.

For this reason, when the input of the fading instruction is set to be valid, the controlling part 20 changes the contents of the input presence information corresponding to the photographing instruction in the determination table for the photographing mode to indicate that the input of the photographing instruction is invalid during the animation photographing. Thus the controlling part 20 sets the input of the photographing instruction to be invalid during the animation photographing.

When the input of the fading instruction is set to be valid, the controlling part 20 changes the contents of the input presence information corresponding to the zoom-out instruction in the determination table for the photographing mode to indicate that the input of the zoom-out instruction is invalid during the animation photographing. Thus the controlling part 20 sets the input of the zoom-out instruction to be invalid during the animation photographing.

When the input of the fading instruction is set to be valid, the controlling part 20 changes the contents of the input presence information corresponding to the zoom-in instruction in the determination table for the photographing mode to indicate that the input of the zoom-in instruction is invalid during the animation photographing. Thus the controlling part 20 sets the input of the zoom-in instruction to be invalid during the animation photographing.

To the contrary, when setting the input of the fading instruction to be invalid, the controlling part 20 changes the contents of the input presence information corresponding to the photographing instruction in the determination table for the photographing mode to indicate that the input is valid over the photographing mode. Thus the controlling part 20 sets the input of the photographing instruction to be valid over the photographing mode.

When setting the input of the fading instruction to be invalid, the controlling part 20 changes the contents of the input presence information corresponding to the zoom-out instruction in the determination table for the photographing mode to indicate that the input of the zoom-out instruction is valid over the photographing mode. The controlling part 20 sets the input of the zoom-out instruction to be valid over the photographing mode.

When setting the input of the fading instruction to be invalid, the controlling part 20 changes the contents of the input presence information corresponding to the zoom-in instruction in the determination table for the photographing mode to indicate that the input of the zoom-in instruction is valid over the photographing mode. Thus the controlling part 20 sets the input of the zoom-in instruction to be valid over the photographing mode.

When the input of the fading instruction is set to be invalid, the controlling part 20 sets the inputs of the photographing instruction, the photographing preparation instruction, the zoom-out instruction and the zoom-in instruction to be valid over the photographing mode.

When setting the input of the fading instruction to be valid, the controlling part 20 sets the inputs of the photographing instruction, the photographing preparation instruction, the zoom-out instruction and the zoom-in instruction to be invalid during the animation photographing.

When given the region data from the operation screen 16 while the animation photographing is not being performed in the photographing mode, the controlling part 20 determines, based on the region data, the number of held-over regions detected at this time.

When one held-over region is detected, the controlling part 20 extracts the region information indicating the held-over region from the region data. When multiple held-over regions are detected, the controlling part 20 extracts the region information indicating the one largest-area held-over region from the region data.

At this time, the controlling part 20 reads the input determination condition information corresponding to the photographing preparation instruction from the determination table for the photographing mode, for example. The controlling part 20 then compares the region area contained in the region information with the contents of the input determination condition information corresponding to the photographing preparation instruction.

Consequently, when the region area is equal to or less than the third area threshold value, the controlling part 20 determines that the instruction input through the holding-over operation is the photographing preparation instruction. When it is determined that the photographing preparation instruction has been input through the holding-over operation, the controlling part 20 performs the photographing preparation processing in response to the input of the photographing preparation instruction.

To the contrary, when the region area is larger than the third area threshold value, the controlling part 20 determines that the photographing preparation instruction has not been input. At this time, the controlling part 20 reads the input determination condition information corresponding to the photographing instruction from the determination table for the photographing mode, for example. Then the controlling part 20 compares the region area contained in the region information with the contents of the input determination condition information corresponding to the photographing instruction.

Consequently, when the region area is equal to or larger than the first area threshold value, the controlling part 20 determines that the instruction input through the holding-over operation is the photographing instruction. When it is determined that the photographing instruction has been input through the holding-over operation, the controlling part 20 performs the photo shooting processing in response to the input of the photographing instruction.

To the contrary, when the region area is smaller than the first area threshold value, the controlling part 20 determines that the photographing instruction has not been input. The controlling part 20 reads the input determination condition information corresponding to the zoom-in instruction from the determination table for the photographing mode, for example.

The controlling part 20 compares the region area, the region's gravity center position, the region's right end position, the region's left end position, the region's upper end position and the region's lower end position contained in the region information with the contents of the input determination condition information corresponding to the zoom-in instruction.

Consequently, when the region position is within the left input region CIA3 and its region area is equal to or more than the second area threshold value, the controlling part 20 determines that the instruction input through the holding-over operation is the zoom-in instruction. When it is determined that the zoom-in instruction has been input through the holding-over operation, the controlling part 20 performs the zoom processing in response to the input of the zoom-in instruction.

To the contrary, when the region area is equal to or more than the second area threshold value and at least one of the region's gravity center position, the region's right end position, the region's left end position, the region's upper end position and the region's lower end position is out of the left input region CIA3, the controlling part 20 determines that the zoom-in instruction has not been input.

The controlling part 20 reads the input determination condition information corresponding to the zoom-out instruction from the determination table for the photographing mode, for example. Then the controlling part 20 compares the region position contained in the region information with the contents of the input determination condition information corresponding to the zoom-out instruction.

Consequently, when the region position is within the right input region CIA2, the controlling part 20 determines that the instruction input through the holding-over operation is the zoom-out instruction. When it is determined that the zoom-out instruction has been input through the holding-over operation, the controlling part 20 performs the zoom processing in response to the input of the zoom-out instruction.

To the contrary, when at least one of the region's gravity enter position, the region's right end position, the region's left end position, the region's upper end position and the region's lower end position is out of the right input region CIA2, the controlling part 20 determines that the zoom-out instruction has not been input.

At this time, the controlling part 20 reads the input determination condition information corresponding to the recording start instruction from the determination table for the photographing mode, for example. Then the controlling part 20 compares the region position contained in the region information with the contents of the input determination condition information corresponding to the recording start instruction.

Consequently, when the region position is within the upper input region CIA4, the controlling part 20 determines that the instruction input through the holding-over operation is the recording start instruction. When it is determined that the recording start instruction has been input through the holding-over operation, the controlling part 20 starts the animation photographing processing (that is, starts to record the animation photographing) in response to the input of the recording start instruction.

When at least one of the region's gravity center position, the region's right end position, the region's left end position, the region's upper end position and the region's lower end position is out of the upper input region CIA4, the controlling part 20 determines that no instruction has been input.

When the region area is smaller than the second area threshold value, the controlling part 20 reads the input determination condition information corresponding to the moving instruction from the determination table for the photographing mode. Then the controlling part 20 compares the region area contained in the region information with the contents of the input determination condition information corresponding to the moving instruction.

Consequently, when the region area is between the lower-limit threshold value and the upper-limit threshold value, the controlling part 20 determines that the instruction input through the holding-over operation is the moving instruction. When it is determined that the moving instruction has been input through the holding-over operation, the controlling part 20 performs the movement processing in response to the input of the moving instruction.

When the region area is smaller than the lower-limit threshold value or larger than the upper-limit threshold value, the controlling part 20 determines that no instruction has been input.

Until the animation photographing is started in the photographing mode, the controlling part 20 appropriately determines which of the photographing preparation instruction, the photographing instruction, the zoom-in instruction, the zoom-out instruction, the moving instruction and the recording start instruction has been input through the holding-over operation.

When the animation photographing processing is started, the controlling part 20 determines whether the input of the fading instruction is valid. As a result, when the input of the fading instruction is invalid, the controlling part 20 waits for the detection of the holding-over operation by the operation screen 16.

When given the region data from the operation screen 16 during the animation photographing, the controlling part 20 determines, based on the region data, the number of detected held-over regions. When one held-over region is detected, the controlling part 20 extracts the region information indicating the held-over region from the region data. When multiple held-over regions are detected, the controlling part 20 extracts the region information indicating the one largest-area held-over region from the region data.

The controlling part 20 reads the input determination condition information corresponding to the photographing instruction from the determination table for the photographing mode, for example. Then the controlling part 20 compares the region area contained in the region information with the contents of the input determination condition information corresponding to the photographing instruction.

Consequently, when the region area is equal to or more than the first area threshold value, the controlling part 20 determines that the instruction input through the holding-over operation is the photographing instruction. When it is determined that the photographing instruction has been input through the holding-over operation, the controlling part 20 performs the photo shooting processing in response to the input of the photographing instruction while performing the animation photographing processing.

To the contrary, when the region area is smaller than the first area threshold value, the controlling part 20 determines that the photographing instruction has not been input. The controlling part 20 reads the input determination condition information corresponding to the zoom-in instruction from the determination table for the photographing mode, for example.

The controlling part 20 compares the region area, the region's gravity center position, the region's right end position, the region's left end position, the region's upper end position and the region's lower end position contained in the region information with the contents of the input determination condition information corresponding to the zoom-in instruction.

Consequently, when the region position is within the left input region CIA3 and its region area is equal to or larger than the second area threshold value, the controlling part 20 determines that the instruction input through the holding-over operation is the zoom-in instruction.

When it is determined that the zoom-in instruction has been input through the holding-over operation, the controlling part 20 performs the zoom processing in response to the input of the zoom-in instruction while performing the animation photographing processing.

To the contrary, when the region area is equal to or larger than the second area threshold value and at least one of the region's gravity center position, the region's right end position, the region's left end position, the region's upper end position and the region's lower end position is out of the left input region CIA3, the controlling part 20 determines that the zoom-in instruction has not been input.

The controlling part 20 reads the input determination condition information corresponding to the zoom-out instruction from the determination table for the photographing mode, for example. Then the controlling part 20 compares the region position contained in the region information with the contents of the input determination condition information corresponding to the zoom-out instruction.

Consequently, when the region position is within the right input region CIA2, the controlling part 20 determines that the instruction input through the holding-over operation is the zoom-out instruction. When it is determined that the zoom-out instruction has been input through the holding-over operation, the controlling part 20 performs the zoom processing in response to the input of the zoom-out instruction while performing the animation photographing processing.

To the contrary, when at least one of the region's gravity center position, the region's right end position, the region's left end position, the region's upper end position and the region's lower end position is out of the right input region CIA2, the controlling part 20 determines that the zoom-out instruction has not been input.

At this time, the controlling part 20 reads the input determination condition information corresponding to the recording end instruction from the determination table for the photographing mode, for example. Then the controlling part 20 compares the region position contained in the region information with the contents of the input determination condition information corresponding to the recording end instruction.

Consequently, when the region position is within the lower input region CIA5, the controlling part 20 determines that the instruction input through the holding-over operation is the recording end instruction. When it is determined that the recording end instruction has been input through the holding-over operation, the controlling part 20 ends the animation photographing processing (that is, ends the recording of the animation photographing) in response to the input of the recording end instruction.

When at least one of the region's gravity center position, the region's right end position, the region's left end position, the region's upper end position and the region's lower end position is out of the lower input region CIA5, the controlling part 20 determines that no instruction has been input.

When the region area is smaller than the second area threshold value, the controlling part 20 reads the input determination condition information corresponding to the moving instruction from the determination table for the photographing mode, for example. The controlling part 20 compares the region area contained in the region information with the contents of the input determination condition information corresponding to the moving instruction.

Consequently, when the region area is between the lower-limit threshold value and the upper-limit threshold value, the controlling part 20 determines that the instruction input through the holding-over operation is the moving instruction. When it is determined that the moving instruction has been input through the holding-over operation, the controlling part 20 performs the movement processing in response to the input of the moving instruction while performing the animation photographing processing.

When the region area is smaller than the lower-limit threshold value or larger than the upper-limit threshold value, the controlling part 20 determines that no instruction has been input.

When the input of the fading instruction is invalid during the animation photographing, the controlling part 20 appropriately determines which of the photographing instruction, the zoom-in instruction, the zoom-out instruction, the moving instruction and the recording end instruction has been input through the holding-over operation.

When the animation photographing processing has been started and the input of the fading instruction turns out to be valid as a result of determining whether the input of the fading instruction is valid, the controlling part 20 waits for the detection of the holding-over operation by the operation screen 16.

When given the region data from the operation screen 16 during the animation photographing, the controlling part 20 determines, based on the region data, the number of detected held-over regions. When one held-over region is detected, the controlling part 20 extracts the region information indicating the held-over region from the region data.

The controlling part 20 reads the input determination condition information corresponding to the recording end instruction from the determination table for the photographing mode, for example.

Then the controlling part 20 compares the region area, the region's gravity center position, the region's right end position, the region's left end position, the region's upper end position and the region's lower end position contained in the region information with the contents of the input determination condition information corresponding to the recording end instruction.

Consequently, when the region position is within the lower input region CIA5 and its region area is equal to or larger than the second area threshold value, the controlling part 20 determines that the instruction input through the holding-over operation is the recording end instruction.

When it is determined that the recording end instruction has been input through the holding-over operation, the controlling part 20 ends the animation photographing processing (that is, ends the recording of the animation photographing) in response to the input of the recording end instruction.

To the contrary, when at least one of the region's gravity center position, the region's right end position, the region's left end position, the region's upper end position and the region's lower end position is out of the lower input region CIA5 and/or its region area is smaller than the second area threshold value, the controlling part 20 determines that the recording end instruction has not been input.

When it is determined that the recording end instruction has not been input, the controlling part 20 reads the input determination condition information corresponding to the fading instruction from the determination table for the photographing mode, for example. Then the controlling part 20 compares the region area contained in the region information with the contents of the input determination condition information corresponding to the fading instruction.

Consequently, when the region area is equal to or larger than the fourth area threshold value, the controlling part 20 determines that the instruction input through the holding-over operation is the fading instruction. When it is determined that the fading instruction has been input through the holding-over operation, the controlling part 20 performs the fade processing in response to the input of the fading instruction. When the region area is smaller than the fourth area threshold value, the controlling part 20 determines that no instruction has been input.

When at least two held-over regions are detected on the operation screen 16 while the input of the fading instruction is valid during the animation photographing, the controlling part 20 extracts the region information indicating the largest held-over region from the given region data.

The controlling part 20 reads the input determination condition information corresponding to the recording end instruction from the determination table for the photographing mode, for example.

The controlling part 20 compares the region area, the region's gravity center position, the region's right end position, the region's left end position, the region's upper end position and the region's lower end position contained in the region information with the contents of the input determination condition information corresponding to the recording end instruction.

Consequently, when the region position is within the lower input region CIA5 and its region area is equal to or larger than the second area threshold value, the controlling part 20 determines that the instruction input through the holding-over operation is the recording end instruction.

When it is determined that the recording end instruction has been input through the holding-over operation, the controlling part 20 ends the animation photographing processing (that is, ends the recording of the animation photographing) in response to the input of the recording end instruction.

To the contrary, when at least one of the region's gravity center position, the region's right end position, the region's left end position, the region's upper end position and the region's lower end position is out of the lower input region CIA5 and/or its region area is smaller than the second area threshold value, the controlling part 20 determines that the recording end instruction has not been input.

The controlling part 20 additionally extracts the region information indicating the second largest held-over region from the region data given from the operation screen 16. The controlling part 20 reads the input determination condition information corresponding to the fading instruction from the determination table for the photographing mode, for example.

Then the controlling part 20 compares the region areas contained in the two items of region information with the contents of the input determination condition information corresponding to the fading instruction. As a result, when at least one region area is equal to or larger than the fourth area threshold value, the controlling part 20 determines that the instruction input through the holding-over operation is the fading instruction.

When it is determined that the fading instruction has been input through the holding-over operation, the controlling part 20 performs the fade processing in response to the input of the fading instruction. When both the two region areas are smaller than the fourth area threshold value, the controlling part 20 determines that no instruction has been input.

When the input of the fading instruction is valid during the animation photographing, the controlling part 20 appropriately determines which of the recording end instruction and the fading instruction has been input through the holding-over operation.

(1-6 Photographing Control Processing)

There will be described below a photographing control processing in which the controlling part 20 determines an instruction input through the holding-over operation and controls the photographing based on the determined instruction in the photographing mode.

Figure 13:
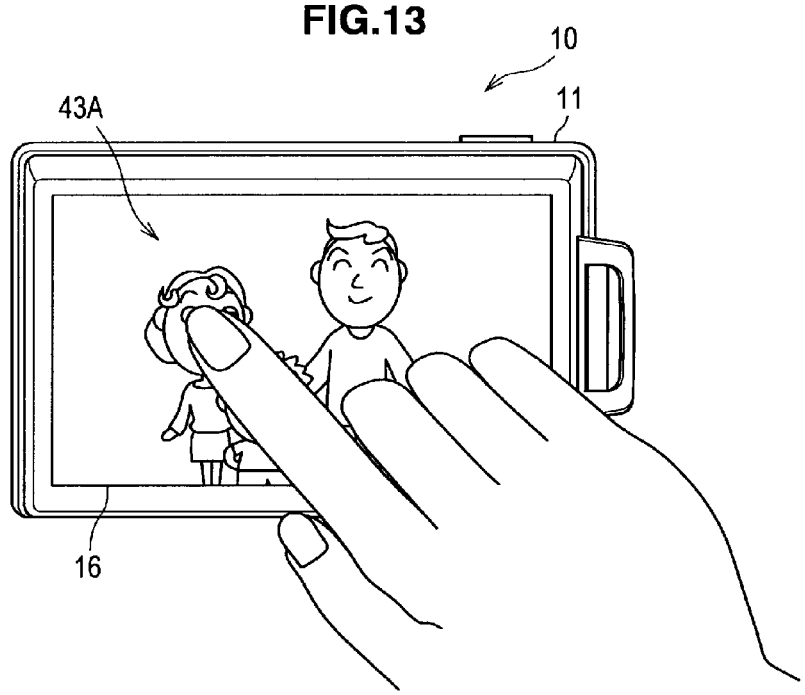
FIG. 13 is a schematic diagram for explaining a photographing preparation processing in response to an input of a photographing preparation instruction.

As shown in FIG. 13, when a finger as the operation member is held over a subject (person's face) to input a photographing preparation instruction while the photographing state presenting image is being displayed on the operation screen 16 except during the animation photographing, the controlling part 20 performs the photographing preparation processing.

At this time, the controlling part 20 controls to drive the optical unit 23 via the driver 25, for example. The controlling part 20 adjusts focus or exposure of the part (specific part such as person's face designated through the holding-over operation) corresponding to the region's gravity center position in the photographing range indicated by the photographing state presenting image to prepare the photo shooting.

When completing the preparation of the photo shooting, the controlling part 20 keeps the prepared state (referred to as preparation completed state below) until a predetermined keeping time (about several seconds) elapses after the preparation is completed. When the photographing instruction is input subsequent to the photographing preparation instruction, the controlling part 20 photographs the subject in the photo shooting prepared state.

Figure 14:
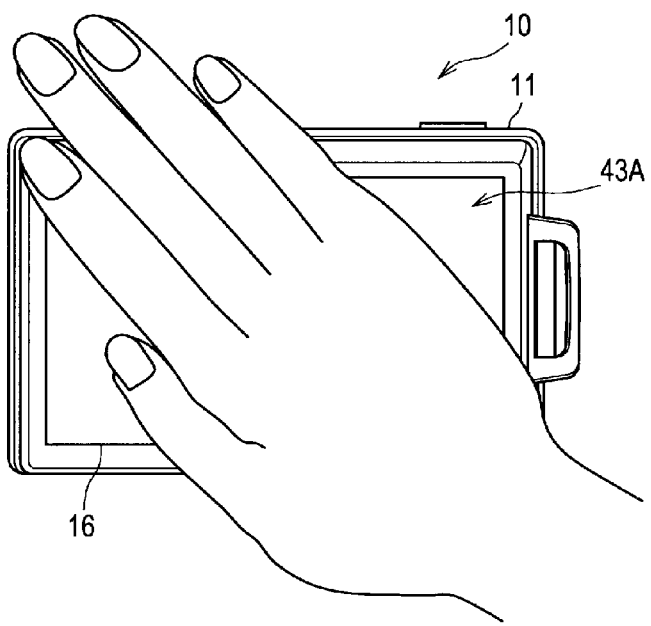
FIG. 14 is a schematic diagram for explaining a photo shooting processing in response to an input of a photographing instruction.

As shown in FIG. 14, when a palm as the operation member is held over substantially the entire display surface 43A to input the photographing instruction while the photographing state presenting image is being displayed on the operation screen 16, the controlling part 20 performs the photo shooting processing.

If the preparation completed state is kept when the photographing instruction is input while the animation is not being photographed, the controlling part 20 controls the photographing part 22 and the codec 29 together to photograph the subject and to generate the photographic image data. Then the controlling part 20 records the photographic image data (or the compressed photographic image data) in the recording medium 30.

If the photo shooting preparation is not completed when the photographing instruction is input, the controlling part 20 automatically adjusts the focus or exposure of the part corresponding to the region's gravity center position detected through the holding-over operation in the photographing range to prepare the photo shooting.

In other words, when the photographing preparation instruction is not previously input and the photographing instruction is input or when the photographing instruction is input after the photo shooting preparation, which has been completed in response to the input of the photographing preparation instruction, is released, the controlling part 20 prepares the photo shooting.

The controlling part 20 then controls the photographing part 22 and the codec 29 together to photograph the subject and to generate the photographic image data, and records the photographic image data (or the compressed photographic image data) in the recording medium 30.

When the input of the fading instruction is invalid also during the animation photographing, the controlling part 20 performs the photo shooting processing in response to the input of the photographing instruction. When the photo shooting is performed during the animation photographing, the controlling part 20 does not adjust the focus or exposure of a specific part in the photographing range for preparing the photo shooting, but performs the photo shooting processing in response to the input of the photographing instruction.

The controlling part 20 prevents the focus or exposure of a specific part such as the person's face from being changed to be different from other parts in the dynamic image obtained through the animation photographing.

Figure 15A:
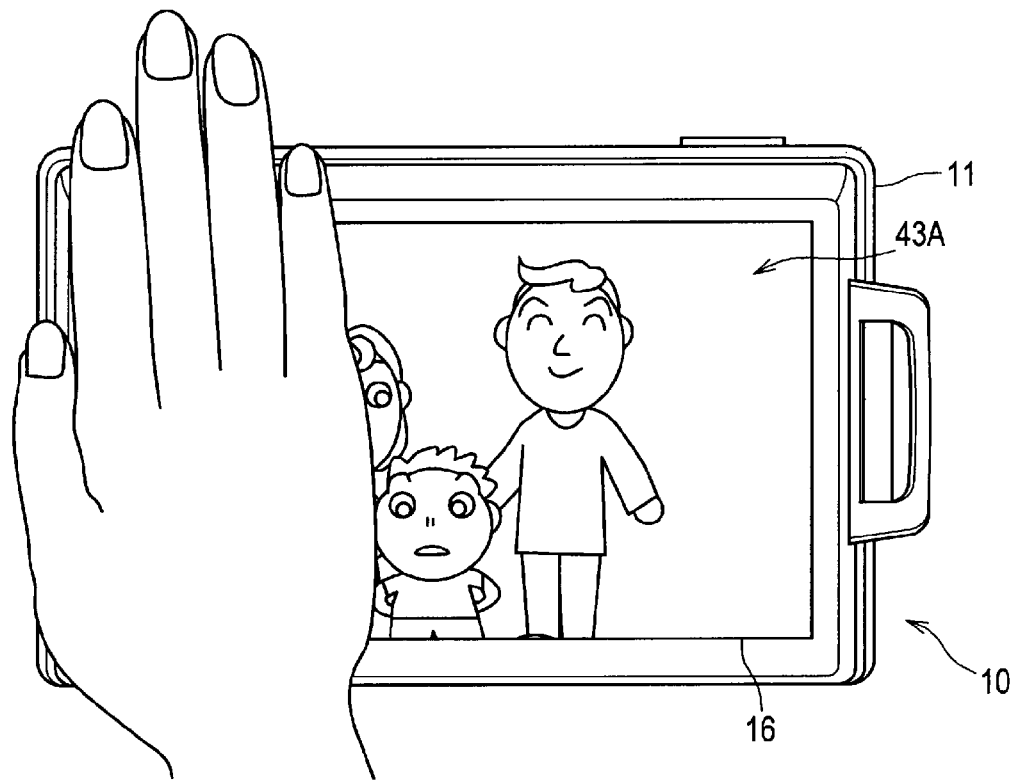
FIG. 15A is a schematic diagram for explaining a zoom processing in response to an input of a zoom-in instruction.
Figure 15B:
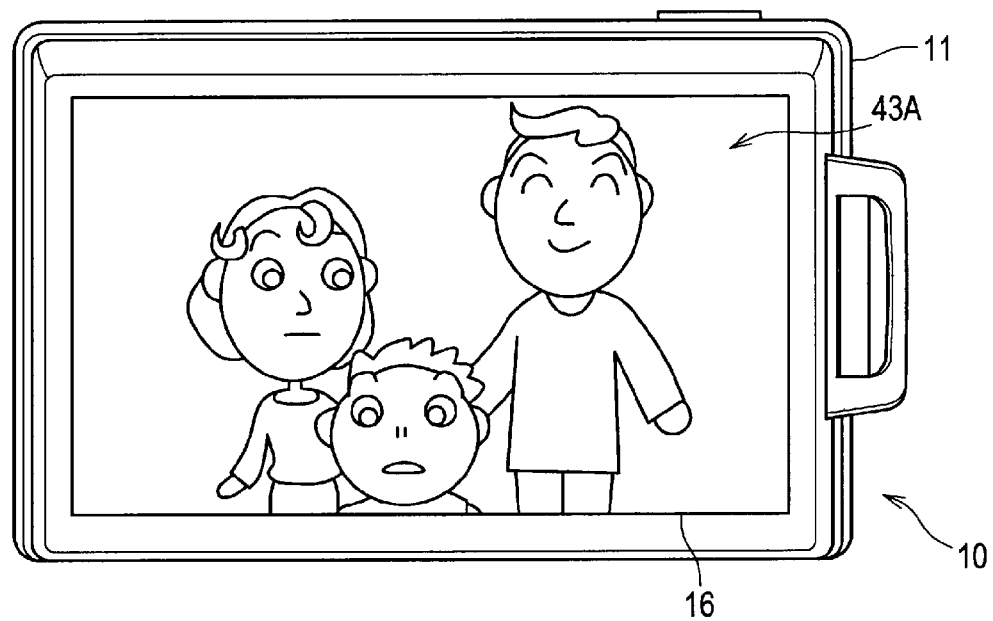
FIG. 15B is a schematic diagram for explaining a zoom processing in response to an input of a zoom-in instruction.

As shown in FIGS. 15A and 15B, when an operator's palm as the operation member is held over substantially the left half of the display surface 43A to input the zoom-in instruction while the photographing state presenting image is being displayed, the controlling part 20 performs the zoom-in processing. At this time, the controlling part 20 controls to drive the optical unit 23 via the driver 25, for example, thereby moving the zoom lens to narrow the photographing range.

While the palm is being held over substantially the left half of the display surface 43A, the controlling part 20 gradually moves the zoom lens. The controlling part 20 can easily select how much the photographing range is narrowed depending on how long the palm is being held over substantially the left half of the display surface 43A.

Figure 16A:
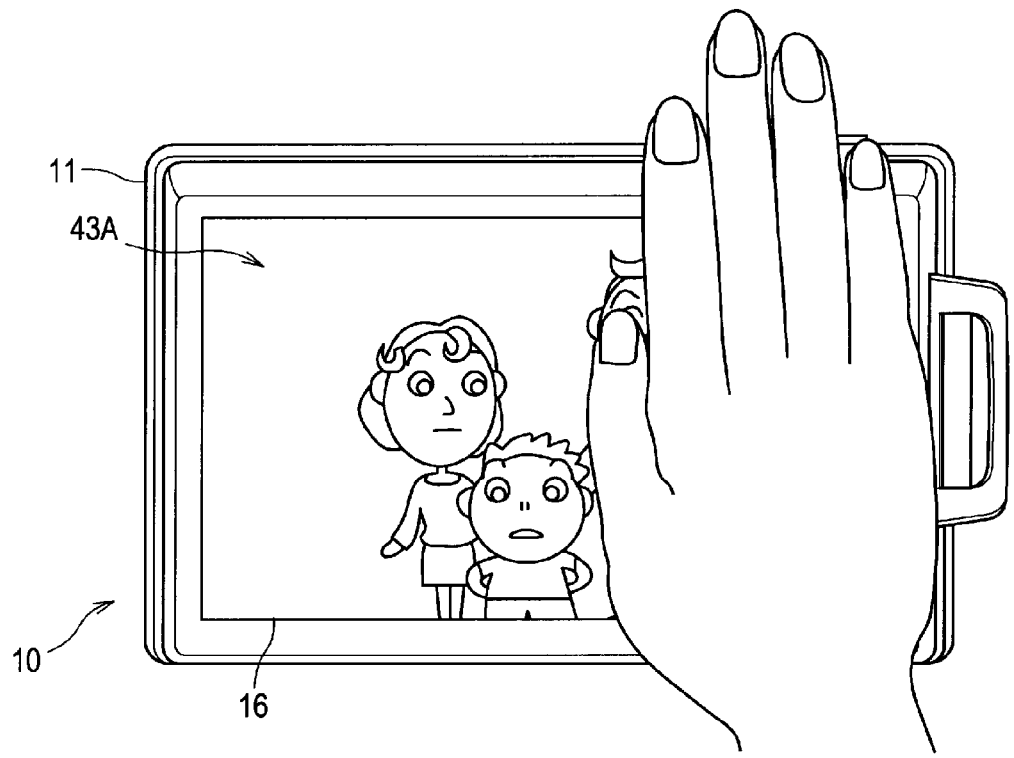
FIG. 16A is a schematic diagram for explaining the zoom processing in response to an input of a zoom-out instruction.
Figure 16B:
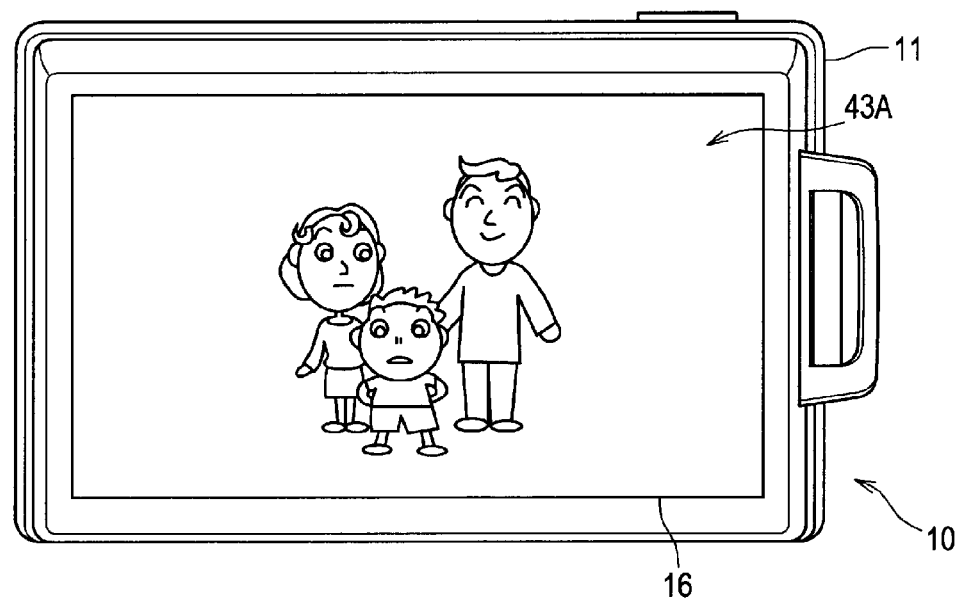
FIG. 16B is a schematic diagram for explaining the zoom processing in response to an input of a zoom-out instruction.

As shown in FIGS. 16A and 16B, when a palm as the operation member is held over substantially the right half of the display surface 43A to input the zoom-out instruction while the photographing state presenting image is being displayed, the controlling part 20 performs the zoom-out processing. At this time, the controlling part 20 controls to drive the optical unit 23 via the driver 25, for example, thereby moving the zoom lens to widen the photographing range.

The controlling part 20 gradually moves the zoom lens while the palm is being held over substantially the right half of the display surface 43A. The controlling part 20 can easily select how much the photographing range is widened depending on how long the palm is being held over substantially the right half of the display surface 43A.

Figure 17:
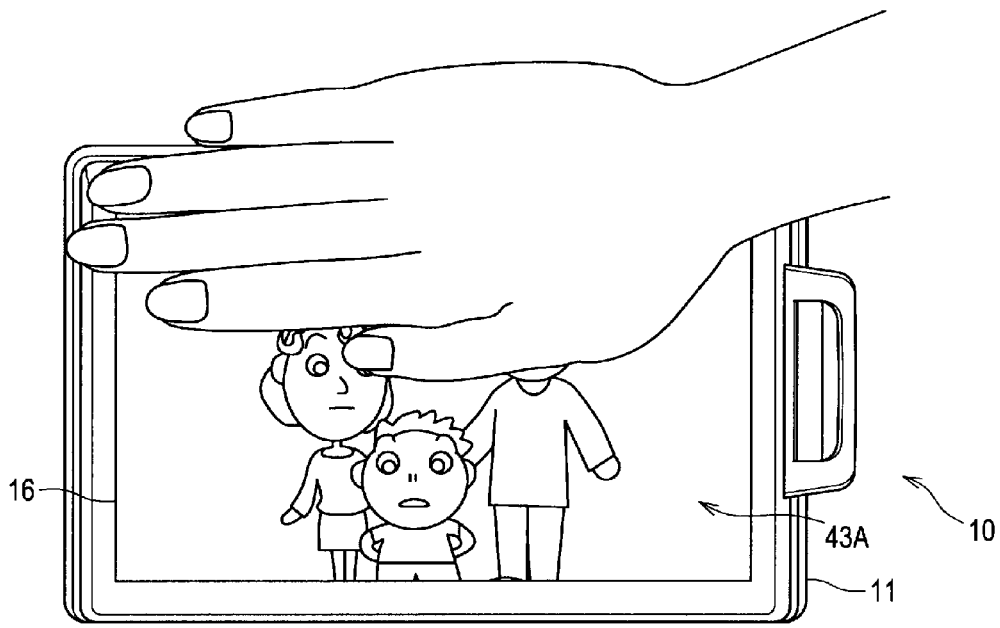
FIG. 17 is a schematic diagram for explaining the starting of an animation photographing processing in response to an input of a recording start instruction.

As shown in FIG. 17, when a palm as the operation member is held over the upper half of the display surface 43A to input the recording start instruction while the photographing state presenting image is being displayed on the operation screen 16, the controlling part 20 starts the animation photographing processing.

At this time, the controlling part 20 controls the photographing part 22 and the codec 29 together to start the animation photographing of the subject (that is, to start the recording of the photographing), thereby starting to generate and record the dynamic image data (or the compressed dynamic image data) in the recording medium 30.

Figure 18:
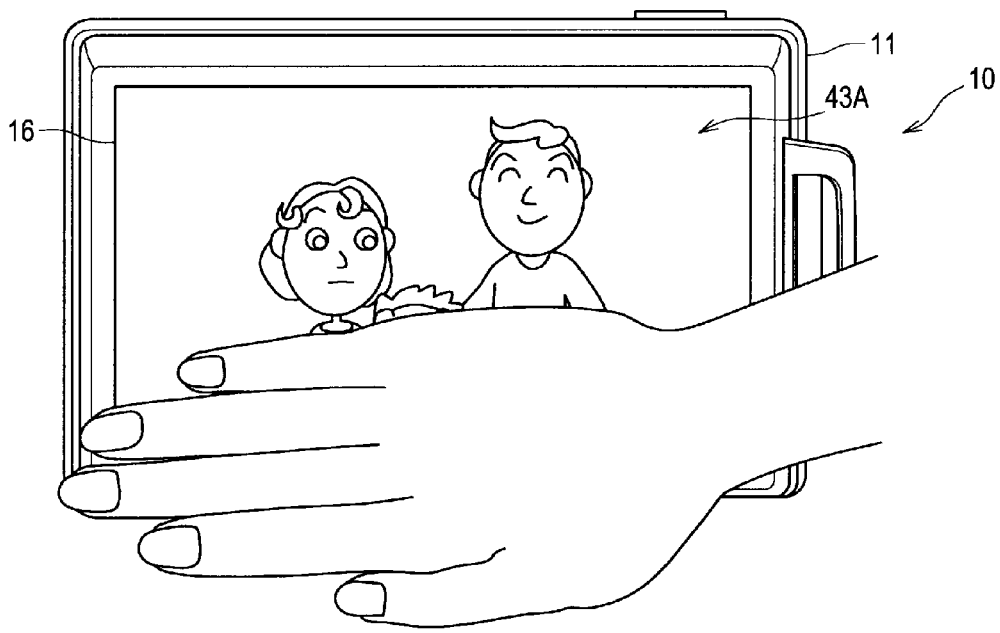
FIG. 18 is a schematic diagram for explaining the end of the animation photographing processing in response to an input of a recording end instruction.

As shown in FIG. 18, when a palm as the operation member is held over the lower half of the display surface 43A to input the recording end instruction, for example, after the animation photographing processing is started, the controlling part 20 ends the animation photographing processing in progress.

The controlling part 20 controls the photographing part 22 and the codec 29 together to end the animation photographing of the subject (that is, to end the recording of the photographing), thereby ending the generating and recording of the dynamic image data (or the compressed dynamic image data) in the recording medium 30.

Figure 19A:
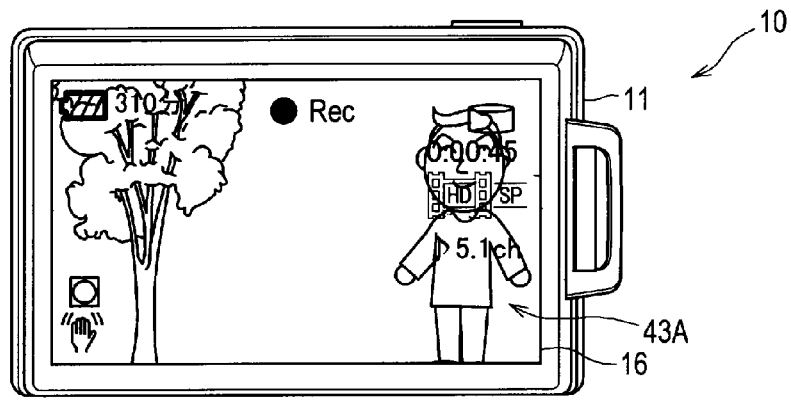
FIG. 19A is a schematic diagram for explaining a movement processing in response to an input of a moving instruction.
Figure 19B:
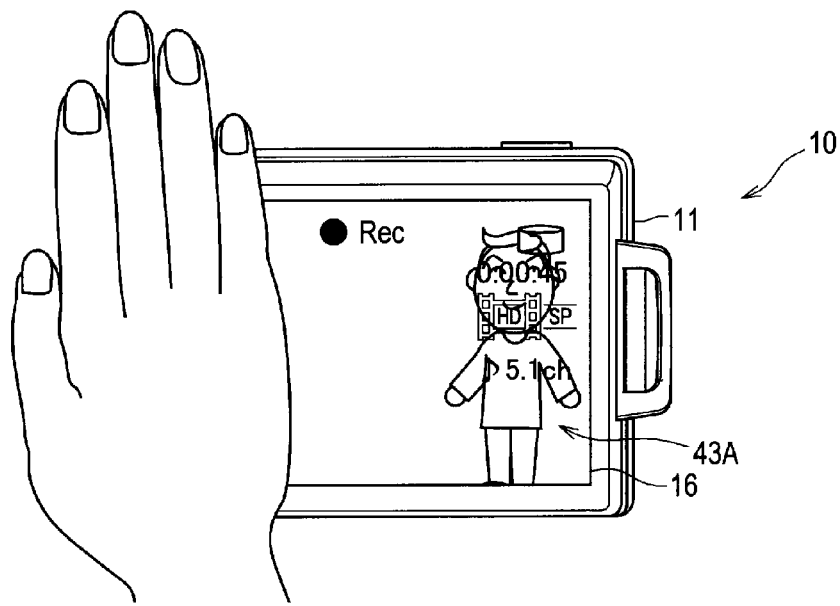
FIG. 19B is a schematic diagram for explaining a movement processing in response to an input of a moving instruction.
Figure 19C:
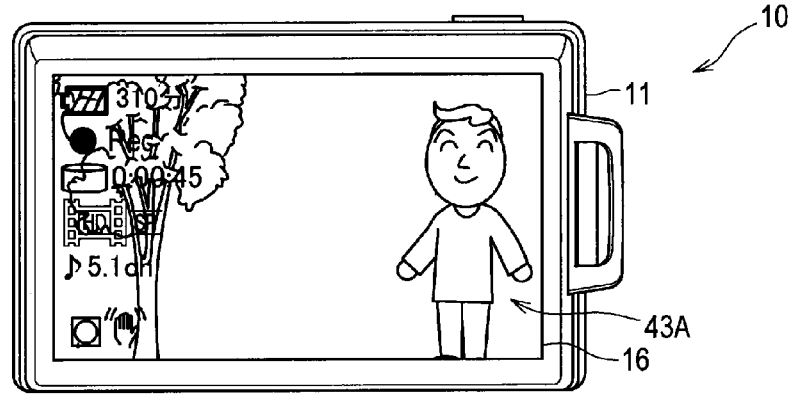
FIG. 19C is a schematic diagram for explaining a movement processing in response to an input of a moving instruction.

As shown in FIGS. 19A to 19C, the controlling part 20 displays the icons indicating the use state of the digital camera 10 over the photographing state presenting image in a predetermined layout while the photographing state presenting image is being displayed on the operation screen 16 before the animation photographing.

The controlling part 20 displays the text indicating the state of the animation photographing over the photographing state presenting image in a predetermined layout while the photographing state presenting image is being displayed on the operation screen 16 during the animation photographing.

When a palm as the operation member is held over near the right end, the left end, the upper end or the lower end of the display surface 43A to input the moving instruction while the photographing state presenting image is being displayed on the operation screen 16, the controlling part 20 performs the movement processing.

The controlling part 20 detects the position of the held-over region on the display surface 43A (close to the right end, the left end, the upper end or the lower end of the display surface 43A) depending on the region's gravity center position (or the region position) detected through the holding-over operation.

The controlling part 20 changes the combination position of the image data of multiple icons or the text data of multiple texts for the photographing state presenting image data according to the detection result. The controlling part 20 moves and displays the icons or texts onto the part on the photographing state presenting image over which the operation member is held.

In this manner, the controlling part 20 moves the icons or texts within the photographing state presenting image closer to the right end, the left end, the upper end or the lower end over which the operation member is held from above the subject. Thus the controlling part 20 can prevent difficult confirmation of the subject's photographing state by the icons or texts.

Figure 20A:
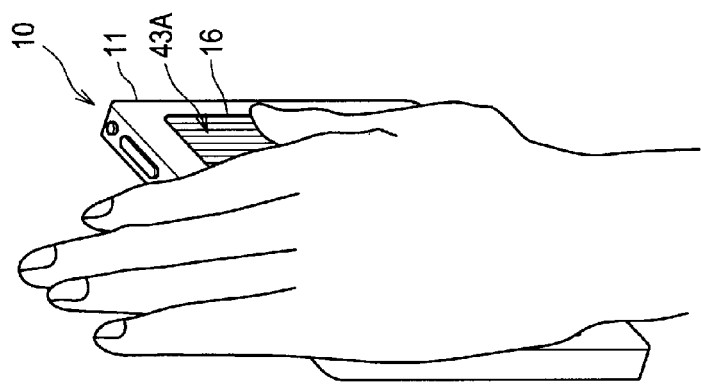
FIG. 20A is a schematic diagram for explaining a fade processing in response to an input of a fading instruction through one hand's holding-over operation.
Figure 20B:
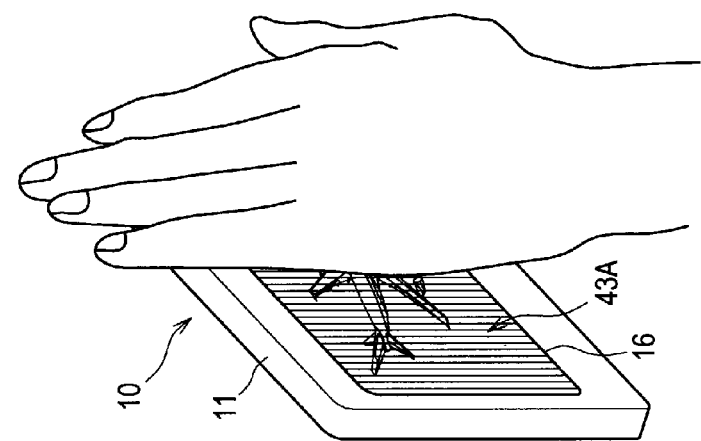
FIG. 20B is a schematic diagram for explaining a fade processing in response to an input of a fading instruction through one hand's holding-over operation.
Figure 20C:
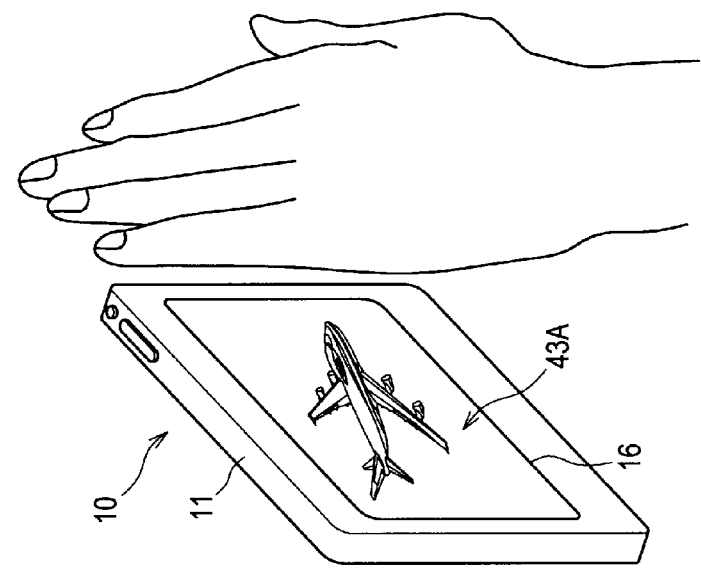
FIG. 20C is a schematic diagram for explaining a fade processing in response to an input of a fading instruction through one hand's holding-over operation.

As shown in FIGS. 20A to 20C, when a palm as the operation member is held over the display surface 43A to input the fading instruction, for example, while the input of the fading instruction is valid during the animation photographing, the controlling part 20 performs the fade processing.

Actually, the controlling part 20 controls the digital processing circuit 28 depending on the region's gravity center position and the region area of the held-over region to perform the fade processing of adjusting luminance or chroma on multiple items of unit dynamic image data constituting the dynamic image data.

When a palm as the operation member is moved away from or closer to the display surface 43A so that the region area is changed, the controlling part 20 controls the digital processing circuit 28 depending on the change. The controlling part 20 performs the fade processing of gradually changing the adjustment values of luminance and chroma on the multiple items of unit dynamic image data constituting the dynamic image data.

When the palm is close to the display surface 43A on the input of the fading instruction, the controlling part 20 changes the full face or one part such as the right or left half corresponding to the held-over region in the multiple unit dynamic images constituting the dynamic image to be black or white.

The controlling part 20 substantially hides the full face or the right or left half corresponding to the held-over region in the multiple unit dynamic images constituting the dynamic image.

When the palm near the display surface 43A is gradually moved away therefrom, the controlling part 20 gradually removes black or white color from the full face or the right or left half corresponding to the held-over region in the multiple unit dynamic images constituting the dynamic image.

Thus the controlling part 20 gradually reveals (or fades in) the picture of the full face or the right or left half corresponding to the held-over region in the multiple unit dynamic images constituting the dynamic image.

To the contrary, when the palm is relatively distant from the display surface 43A on the input of the fading instruction, the controlling part 20 slightly adds black or white color to the full face or one part such as the right or left half corresponding to the held-over region in the multiple unit dynamic images constituting the dynamic image.

The controlling part 20 makes the picture at the full face or the right or left half corresponding to the held-over region in the multiple unit dynamic images constituting the dynamic image slightly unclear.

When the palm is gradually moved closer to the display surface 43A, the controlling part 20 gradually increases black or white color to be added to the full face or the right or left half corresponding to the held-over region in the multiple unit dynamic images constituting the dynamic image.

The controlling part 20 gradually hides (or fades out) the picture of the full face or the right or left half corresponding to the held-over region in the multiple unit dynamic images constituting the dynamic image.

The controlling part 20 can appropriately fade the dynamic image data for generation and recording while performing the animation photographing. The controlling part 20 performs the fade processing also on the photographing state presenting image data generated at the same time as the dynamic image data.

The controlling part 20 can confirm, by the photographing state presenting image displayed on the operation screen 16, the fade state being performed on the dynamic image through the holding-over operation.

Figure 21A:
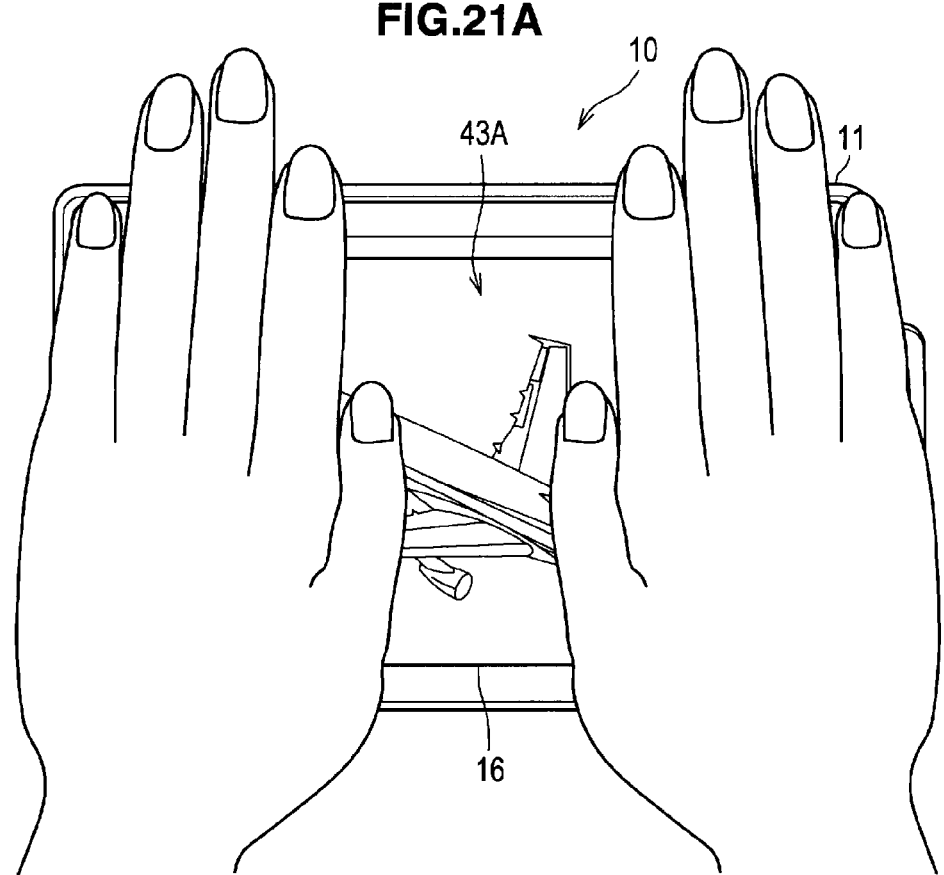
FIG. 21A is a schematic diagram for explaining the fade processing in response to an input of a fading instruction through both hands' holding-over operation.
Figure 21B:
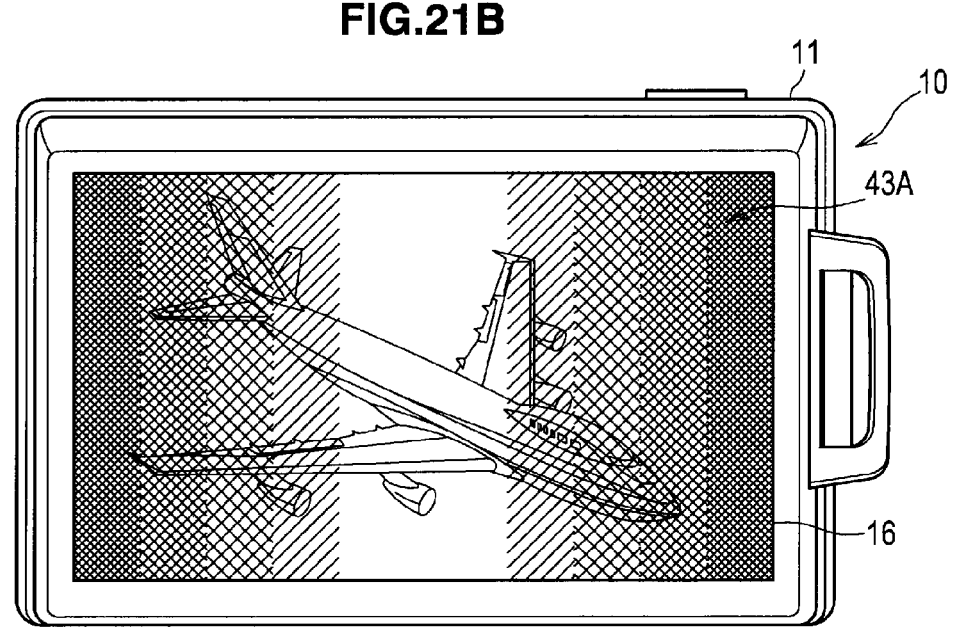
FIG. 21B is a schematic diagram for explaining the fade processing in response to an input of a fading instruction through both hands' holding-over operation.
Figure 22:
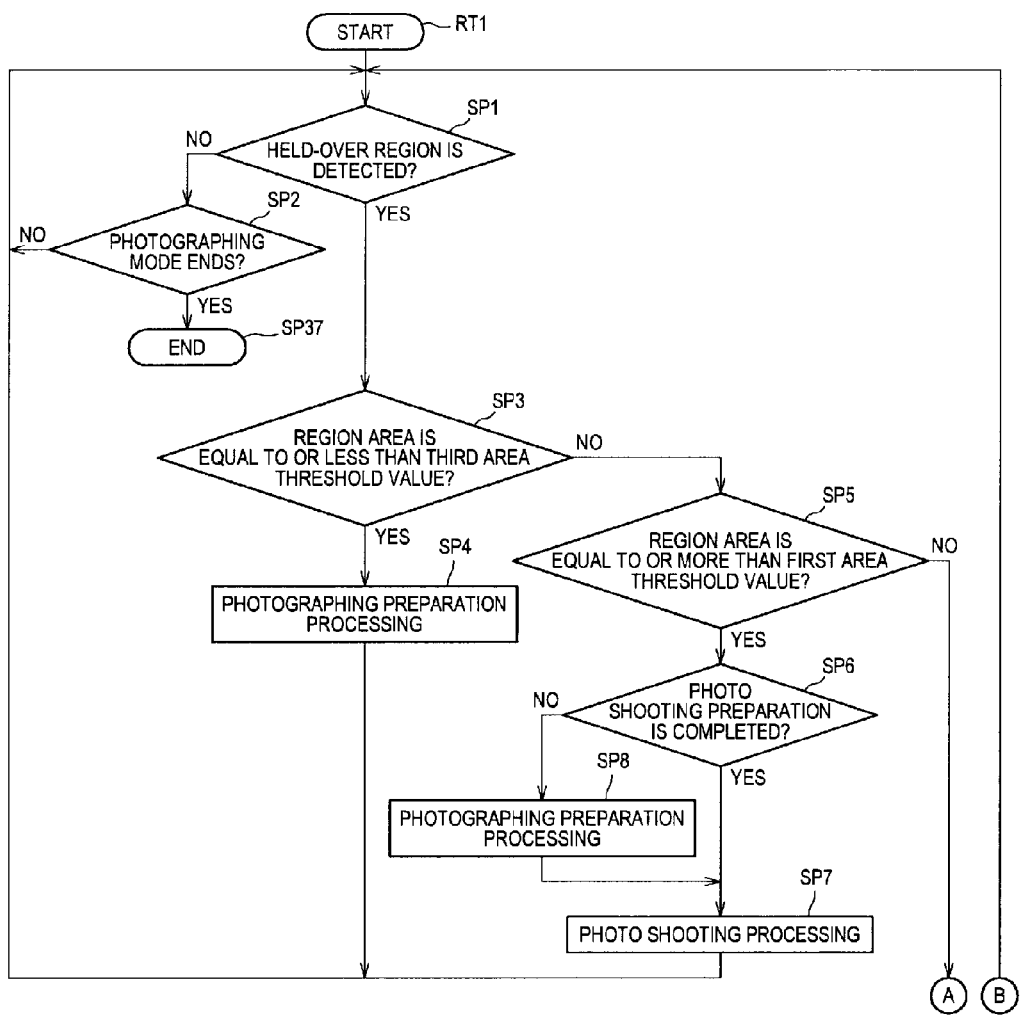
FIG. 22 is a flowchart showing a photographing control processing procedure (1).
Figure 23:
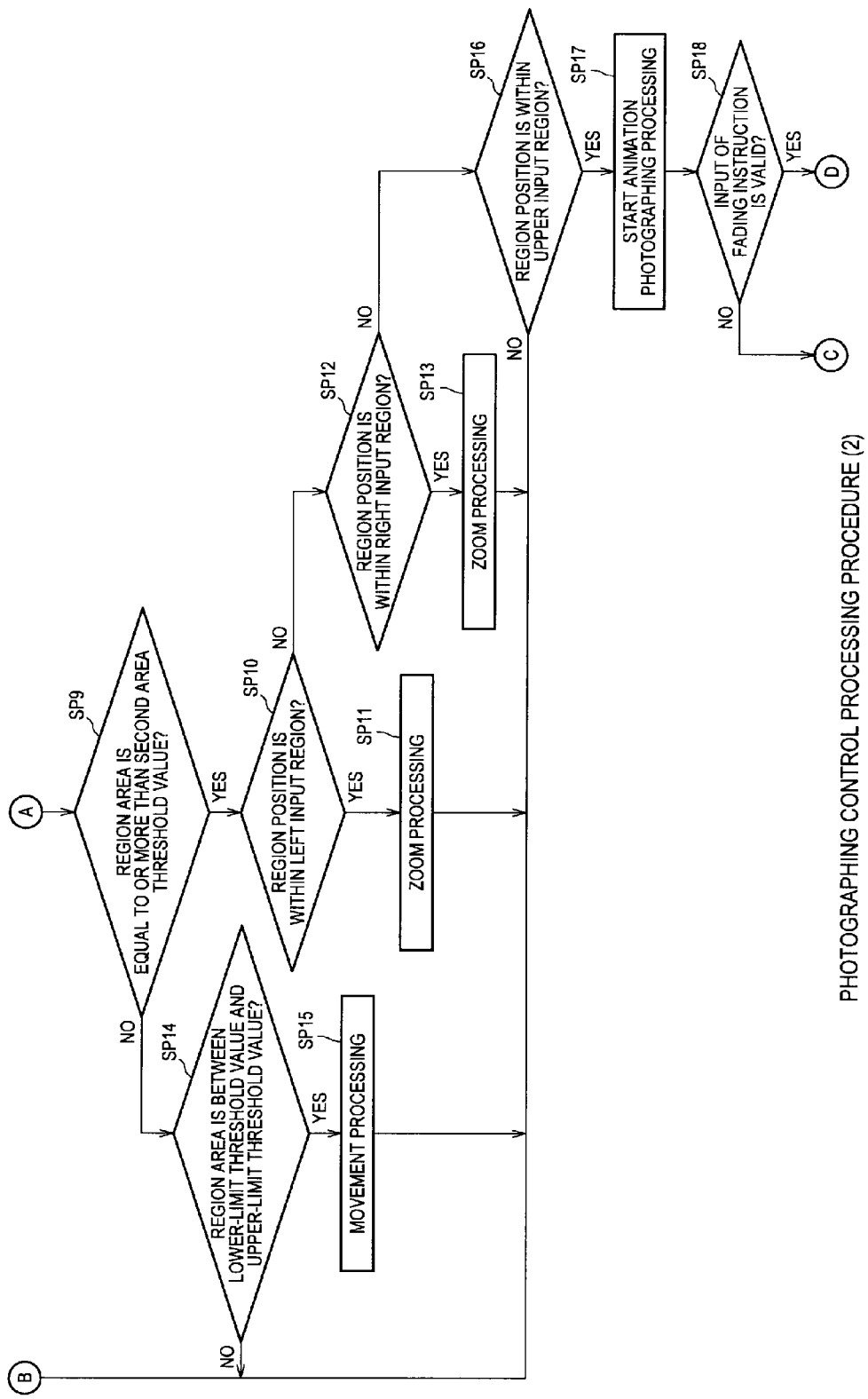
FIG. 23 is a flowchart showing a photographing control processing procedure (2).

As shown in FIGS. 21A and 21B, even when both palms as two simultaneous operation members are held over the display surface 43A to input the fading instruction, for example, while the input of the fading instruction is valid during the animation photographing, the controlling part 20 performs the fade processing.

When only one held-over region in the two held-over regions meets the input condition of the fading instruction, the controlling part 20 processes the same similar to the case in FIGS. 20A to 20C.

When the both the two held-over regions meet the input condition of the fading instruction, the controlling part 20 controls the digital processing circuit 28 depending on the region's gravity center positions and the region areas of the two held-over regions and performs the fade processing on the multiple items of unit dynamic image data constituting the dynamic image data.

When both palms are moved away from and then closer to the display surface 43A so that the two region areas are changed, the controlling part 20 controls the digital processing circuit 28 depending on the changes, thereby performing the fade processing on the multiple items of unit dynamic image data constituting the dynamic image data.

When both palms are close to the display surface 43A on the input of the fading instruction, the controlling part 20 changes the two parts closer to the right and left ends or closer to the upper and left ends corresponding to the two held-over regions in the multiple unit dynamic images constituting the dynamic image to be black or white.

The controlling part 20 substantially hides the pictures at the two parts closer to the right and left ends or closer to the upper and left ends corresponding to the two held-over regions in the multiple unit dynamic images constituting the dynamic image.

When both palms near the display surface 43A are gradually moved away therefrom, the controlling part 20 gradually removes black or white color from the two parts closer to the right and left ends or closer to the upper and left ends corresponding to the two held-over regions in the multiple unit dynamic images constituting the dynamic image.

The controlling part 20 gradually reveals (or fades in) the pictures at the two parts closer to the right and left ends or closer to the upper and left ends corresponding to the two held-over regions in the multiple unit dynamic images constituting the dynamic image.

When both palms are relatively distant from the display surface 43A on the input of the fading instruction, the controlling part 20 slightly adds black or white color to the two parts closer to the right and left ends or closer to the upper and left ends corresponding to the two held-over regions in the multiple unit dynamic images constituting the dynamic image.

The controlling part 20 makes the pictures at the two parts closer to the right and left ends or closer to the upper and left ends corresponding to the two held-over regions in the multiple unit dynamic images constituting the dynamic image slightly unclear.

When both palms are gradually moved closer to the display surface 43A, the controlling part 20 gradually increases black or white color to be added to the two parts closer to the right and left ends or closer to the upper and left ends corresponding to the two held-over regions in the multiple unit dynamic images constituting the dynamic image.

When both palms are gradually moved closer to the display surface 43A, the controlling part 20 gradually widens the two parts, to which black or white color is added, closer to the right and left ends or closer to the upper and left ends corresponding to the two held-over regions in the multiple unit dynamic images constituting the dynamic image.

The controlling part 20 gradually hides (or fades out) the pictures at the two parts closer to the right and left ends or closer to the upper and left ends corresponding to the two held-over regions in the multiple unit dynamic images constituting the dynamic image.

The controlling part 20 gradually widens the two parts the pictures of which are to be gradually hidden, and finally, substantially hides the pictures of the entire unit dynamic images in the multiple unit dynamic images constituting the dynamic image.

The controlling part 20 can appropriately fade the dynamic image data for generation and recording while performing the animation photographing. The controlling part 20 similarly performs the fade processing on the photographing state presenting image data generated at the same time as the dynamic image data.

The controlling part 20 can confirm, by the photographing state presenting image displayed on the operation screen 16, the fading state being performed on the dynamic image through the holding-over operation.

When the fade processing is performed so that the picture made of multiple unit dynamic images constituting the dynamic image is gradually faded out and finally the picture made of the entire unit dynamic images completely disappears, the controlling part 20 starts counting by an internal timer from this point.

When a predetermined time is reached without a newly-input fading instruction after the picture made of the entire unit dynamic images completely disappears, the controlling part 20 automatically ends the animation photographing processing.

When the picture of the dynamic image gradually disappears and the animation photographing is desired to be ended while the picture of the dynamic image is completely invisible, the controlling part 20 can automatically end the animation photographing without the need of inputting the recording end instruction.

(1-7 Photographing Control Processing Procedure)

There will be described below with reference to FIGS. 22 to 26 a photographing control processing procedure RT1 to be performed by the controlling part 20 according to a photographing control program previously stored in the internal memory in the photographing mode.

When entering the photographing mode, the controlling part 20 starts the photographing control processing procedure RT1 shown in FIGS. 22 to 26 according to the photographing control program previously stored in the internal memory. When starting the photographing control processing procedure RT1, the controlling part 20 determines in step SP1 whether a held-over region has been detected.

The result of NO in step SP1 indicates that the holding-over operation has not been performed on the display surface 43A. When obtaining the result of NO in step SP1, the controlling part 20 proceeds to the next step SP2

The controlling part 20 determines in step SP2 whether to end the photographing mode. The result of NO in step SP2 indicates that the transition to the reproduction mode or the power-off has not been instructed. When obtaining the result of NO in step SP2, the controlling part 20 returns to step SP1.

The controlling part 20 repeatedly performs step SP1 and step SP2 until the result of YES is obtained in step SP1 or step SP2, and waits for the holding-over operation or the ending of the photographing mode.

The result of YES in step SP1 indicates that the holding-over operation has been performed on the display surface 43A. When obtaining the result of YES in step SP1, the controlling part 20 proceeds to step SP3.

The controlling part 20 determines in step SP3 whether the region area detected from the holding-over operation is equal to or less than the third area threshold value. The result of YES in step SP3 indicates that a finger as the operation member, for example, has been held over the display surface 43A to input the photographing preparation instruction. When obtaining the result of YES in step SP3, the controlling part 20 proceeds to the next step SP4.

The controlling part 20 controls to drive the optical unit 23 via the driver 25 to perform the photographing preparation processing in step SP4, thereby to adjust the focus or exposure of the part corresponding to the region's gravity center position within the photographing range and to prepare the photo shooting. The controlling part 20 starts to count the keeping time by the internal timer, and returns to step SP1 while maintaining the preparation completed state.

The result of NO in step SP3 indicates that any of the photographing instruction, the zoom-out instruction, the zoom-in instruction, the moving instruction and the recording start instruction may have been input through the holding-over operation. When obtaining the result of NO in step SP3, the controlling part 20 proceeds to step SP5.

The controlling part 20 determines in step SP5 whether the region area detected from the holding-over operation is equal to or more than the first area threshold value. The result of YES in step SP5 indicates that a palm as the operation member has been held over substantially the entire display surface 43A to input the photographing instruction. When obtaining the result of YES in step SP5, the controlling part 20 proceeds to the next step SP6.

The controlling part 20 determines in step SP6 whether the photo shooting preparation has been completed. The result of YES in step SP6 indicates that the preparation completed state is maintained in response to the input of the photographing instruction subsequent to the photographing preparation instruction. When obtaining the result of YES in step SP6, the controlling part 20 proceeds to the next step SP7.

To the contrary, the result of NO in step SP6 indicates that the photographing instruction has been input before the input of the photographing preparation instruction and the photo shooting has not been completely prepared. When obtaining the result of NO in step SP6, the controlling part 20 proceeds to the next step SP8.

In step SP8, the controlling part 20 controls to drive the optical unit 23 via the driver 25 to perform the photographing preparation processing. Thus the controlling part 20 adjusts the focus or exposure of the part corresponding to the region's gravity center position within the photographing range to prepare the photo shooting, and proceeds to step SP7.

While the photo shooting remains prepared, in step SP7, the controlling part 20 controls the photographing part 22 and the codec 29 to perform the photo shooting processing, and then returns to step SP1.

The result of NO in step SP5 indicates that any of the zoom-out instruction, the zoom-in instruction, the moving instruction and the recording start instruction may have been input through the holding-over operation. When obtaining the result of NO in step SP5, the controlling part 20 proceeds to step SP9 in FIG. 23.

The controlling part 20 determines in step SP9 whether the region area detected through the holding-over operation is equal to or more than the second area threshold value. The result of YES in step SP9 indicates that any of the zoom-out instruction, the zoom-in instruction and the recording start instruction may have been input through the holding-over operation. When obtaining the result of YES in step SP9, the controlling part 20 proceeds to step SP10.

The controlling part 20 determines in step SP10 whether the region position detected through the holding-over operation is within the left input region CIA3. The result of YES in step SP10 indicates that a palm as the operation member has been held over substantially the left half of the display surface 43A to input the zoom-out instruction. When obtaining the result of YES in step SP10, the controlling part 20 proceeds to the next step SP11.

The controlling part 20 controls to drive the optical unit 23 via the driver 25 to perform the zoom-in processing and thus moves the zoom lens to narrow the photographing range in step SP11, and then returns to step SP1.

The result of NO in step SP10 indicates that any of the zoom-out instruction and the recording start instruction may have been input through the holding-over operation. When obtaining the result of NO in step SP10, the controlling part 20 proceeds to step SP12.

The controlling part 20 determines in step SP12 whether the region position detected through the holding-over operation is within the right input region CIA2. The result of YES in step SP12 indicates that a palm as the operation member has been held over substantially the right half of the display surface 43A to input the zoom-in instruction. When obtaining the result of YES in step SP12, the controlling part 20 proceeds to the next step SP13.

The controlling part 20 controls to drive the optical unit 23 via the driver 25 to perform the zoom-out processing and thus moves the zoom lens to widen the photographing range in step SP13, and then returns to step SP1.

The result of NO in step SP9 indicates that the moving instruction may have been input through the holding-over operation. When obtaining the result of NO in step SP9, the controlling part 20 proceeds to step SP14.

The controlling part 20 determines in step SP14 whether the region position detected through the holding-over operation is between the lower-limit threshold value and the upper-limit threshold value. The result of YES in step SP14 indicates that a palm as the operation member has been held over near the right end, the left end, the upper end or the lower end of the display surface 43A to input the moving instruction. When obtaining the result of YES in step SP14, the controlling part 20 proceeds to the next step SP15.

The controlling part 20 performs the movement processing to move the icons or texts onto the part on the photographing state presenting image over which the operator has been held in step SP15, and then returns to step SP1.

The result of NO in step SP14 indicates that the operation member has not been held over the display surface 43A for inputting an instruction and thus no instruction has been input. When obtaining the result of NO in step SP14, the controlling part 20 returns to step SP1.

The result of NO in step SP12 indicates that the recording start instruction may have been input through the holding-over operation. When obtaining the result of NO in step SP12, the controlling part 20 proceeds to step SP16.

The controlling part 20 determines in step SP16 whether the region position detected through the holding-over operation is within the upper input region CIA4. The result of NO in step SP16 indicates that the operation member has not been held over the display surface 43A for inputting an instruction and thus no instruction has been input. When obtaining the result of NO in step SP16, the controlling part 20 returns to step SP1.

To the contrary, the result of YES in step SP16 indicates that a palm as the operation member has been held over substantially the upper half of the display surface 43A to input the recording start instruction.

When obtaining the result of YES in step SP16, the controlling part 20 proceeds to the next step SP17. The controlling part 20 controls the photographing part 22 and the codec 29 in step SP17 to start the animation photographing processing (to start the recording of the photographing), and proceeds to the next step SP18.

The controlling part 20 determines in step SP18 whether the input of the fading instruction is currently valid. The result of YES in step SP18 indicates that the dynamic image obtained by the animation photographing is desired to be recorded while being faded and the input of the fading instruction has been preset to be valid.

Figure 24:
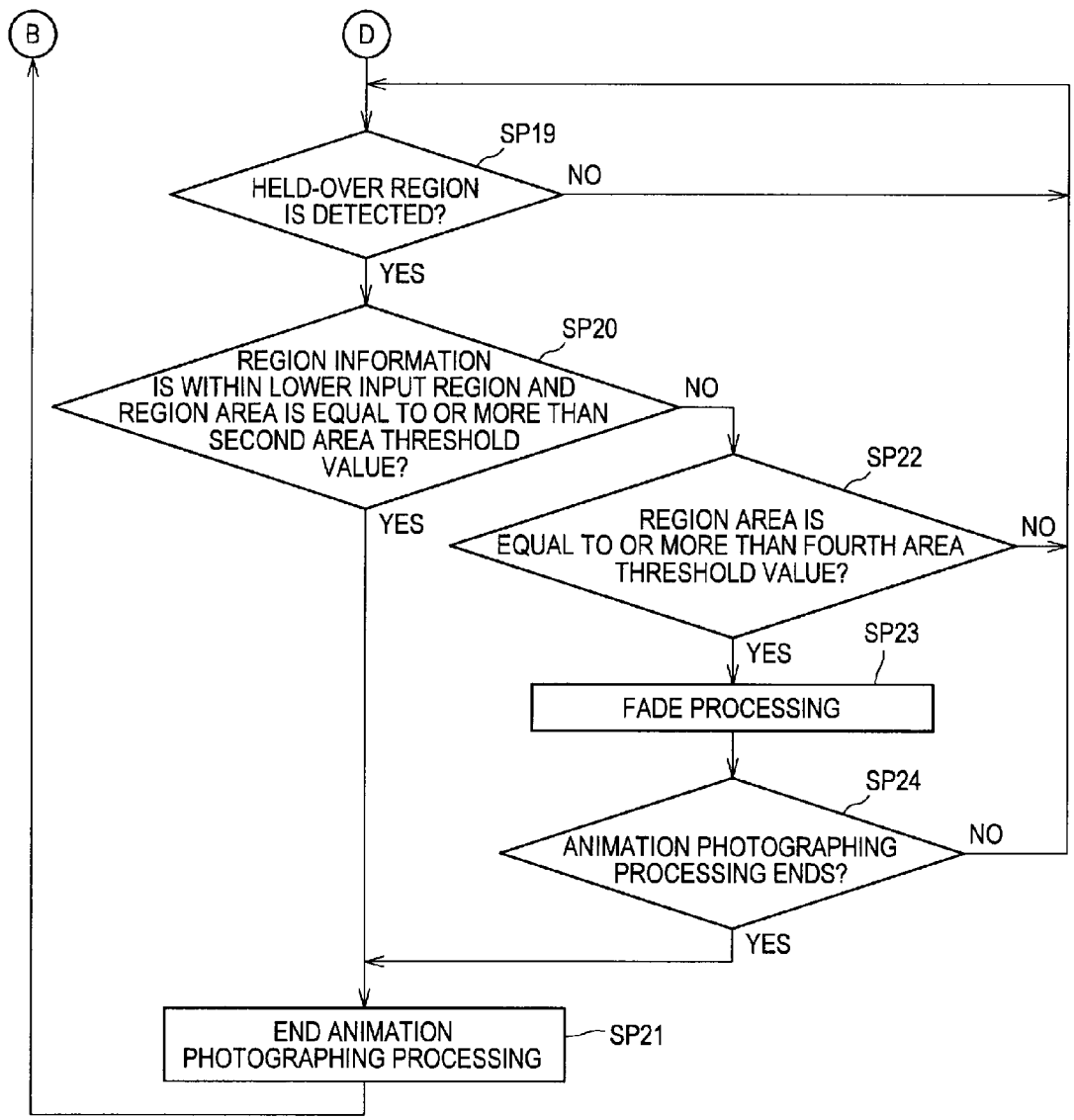
FIG. 24 is a flowchart showing a photographing control processing procedure (3).

When obtaining the result of YES in step SP18, the controlling part 20 proceeds to the next step SP19 in FIG. 24. When waiting for the detection of the held-over region and the held-over region is detected by the operation screen 16 in step SP19, the controlling part 20 proceeds to the next step SP20.

The controlling part 20 determines in step SP20 whether the region position detected through the holding-over operation is within the lower input region CIA4 and the region area is equal to or more than the second area threshold value.

The result of YES in step SP20 indicates that a palm as the operation member has been held over substantially the lower half of the display surface 43A to input the recording end instruction.

When obtaining the result of YES in step SP20, the controlling part 20 proceeds to the next step SP21. The controlling part 20 controls the photographing part 22 and the codec 29 to end the animation photographing processing (to end the recording of the photographing) in step SP21, and then returns to step SP1.

The result of NO in step SP20 indicates that the fading instruction may have been input through the holding-over operation. When obtaining the result of NO in step SP20, the controlling part 20 proceeds to step SP22.

The controlling part 20 determines in step SP22 whether the region area detected through the holding-over operation is equal to or more than the fourth area threshold value. The result of YES in step SP22 indicates that a palm as the operation member has been held over one or two parts on the display surface 43A to input the fading instruction.

When obtaining the result of YES in step SP22, the controlling part 20 proceeds to the next step SP23. The controlling part 20 controls the digital processing circuit 28 to perform the fade processing on the dynamic image data (and the photographing state presenting image data) in step SP23, and then proceeds to the next step SP24.

The controlling part 20 determines in step SP24 whether to automatically end the animation photographing processing.

The result of YES in step SP24 indicates that the full picture of the dynamic image gradually disappears from the visible state and is finally made completely invisible for automatically ending the animation photographing processing and a predetermined time is reached from the time point. When obtaining the result of YES in step SP24, the controlling part 20 proceeds to step SP21.

The result of NO in step SP24 indicates that the full picture of the dynamic image is gradually made visible from the completely invisible state and is finally made completely visible for still continuing the animation photographing. When obtaining the result of NO in step SP24, the controlling part 20 returns to step SP19.

The result of NO in step SP22 indicates that the operation member has not been held over the display surface 43A for inputting an instruction and thus no instruction has been input. When obtaining the result of NO in step SP22, the controlling part 20 returns to step SP19.

The result of NO in step SP18 indicates that the dynamic image obtained by the animation photographing is not desired to be recorded while being faded and the input of the fading instruction has been preset to be invalid.

Figure 25:
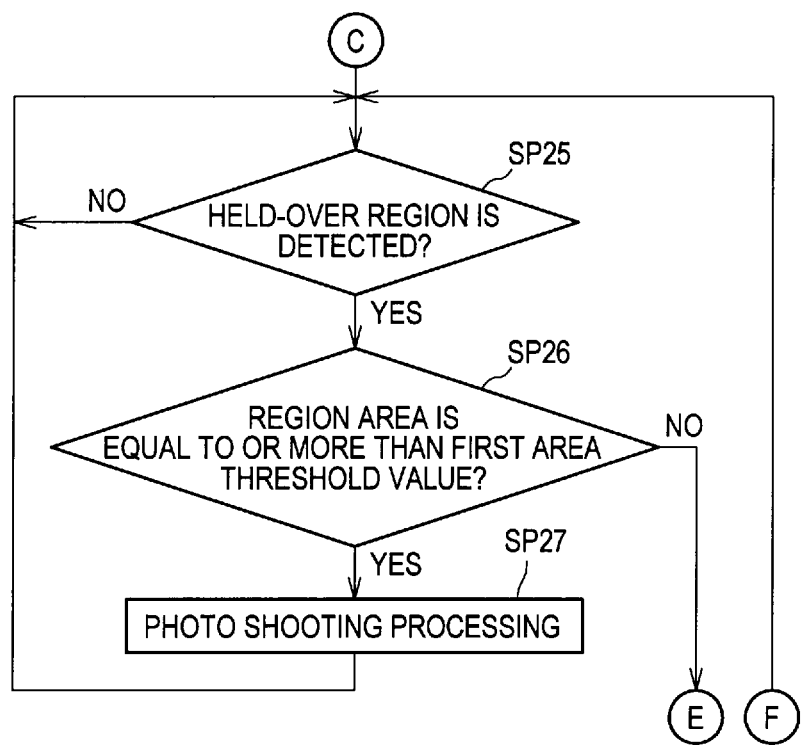
FIG. 25 is a flowchart showing a photographing control processing procedure (4).

When obtaining the result of NO in step SP18, the controlling part 20 proceeds to step SP25 in FIG. 25. The controlling part 20 waits for the detection of the held-over region in step SP25, and when the held-over region is detected by the operation screen 16, proceeds to the next step SP26.

The controlling part 20 determines in step SP26 whether the region area detected through the holding-over operation is equal to or more than the first area threshold value. The result of YES in step SP26 indicates that a palm as the operation member has been held over substantially the entire display surface 43A to input the photographing instruction. When obtaining the result of YES in step SP26, the controlling part 20 proceeds to the next step SP27.

Before completely preparing the photo shooting, the controlling part 20 controls the photographing part 22 and the codec 29 to perform the photo shooting processing in step SP27, and then returns to step SP25.

The result of NO in step SP26 indicates that any of the zoom-out instruction, the zoom-in instruction, the moving instruction and the recording end instruction may have been input through the holding-over operation. When obtaining the result of NO in step SP26, the controlling part 20 proceeds to step SP28 in FIG. 26.

The controlling part 20 determines in step SP28 whether the region area detected through the holding-over operation is equal to or more than the second area threshold value. The result of YES in step SP28 indicates that any of the zoom-out instruction, the zoom-in instruction and the recording start instruction may have been input through the holding-over operation. When obtaining the result of YES in step SP28, the controlling part 20 proceeds to step SP29.

The controlling part 20 determines in step SP29 whether the region position detected through the holding-over operation is within the left input region CIA3. The result of YES in step SP29 indicates that a palm as the operation member has been held over substantially the left half of the display surface 43A to input the zoom-out instruction. When obtaining the result of YES in step SP29, the controlling part 20 proceeds to the next step SP30.

The controlling part 20 controls to drive the optical unit 23 via the driver 25 to perform the zoom processing and thus moves the zoom lens to narrow the photographing range in step SP30, and then returns to step SP25.

The result of NO in step SP29 indicates that any of the zoom-out instruction and the recording end instruction may have been input through the holding-over operation. When obtaining the result of NO in step SP29, the controlling part 20 proceeds to step SP31.

The controlling part 20 determines in step SP31 whether the region position detected through the holding-over operation is within the right input region CIA2. The result of YES in step SP31 indicates that a palm as the operation member has been held over substantially the right half of the display surface 43A to input the zoom-in instruction. When obtaining the result of YES in step SP31, the controlling part 20 proceeds to the next step SP32.

The controlling part 20 controls to drive the optical unit 23 via the driver 25 to perform the zoom processing and thus moves the zoom lens to widen the photographing range in step SP32, and then returns to step SP25.

The result of NO in step SP28 indicates that the moving instruction may have been input through the holding-over operation. When obtaining the result of NO in step SP28, the controlling part 20 proceeds to step SP33.

The controlling part 20 determines in step SP33 whether the region position detected through the holding-over operation is between the lower-limit threshold value and the upper-limit threshold value. The result of YES in step SP33 indicates that a palm as the operation member has been held over near the right end, the left end, the upper end or the lower end of the display surface 43A to input the moving instruction. When obtaining the result of YES in step SP33, the controlling part 20 proceeds to the next step SP34.

The controlling part 20 performs the movement processing to move the icons or texts onto the part on the photographing state presenting image over which the operation member is held in step SP34, and then returns to step SP25.

The result of NO in step SP33 indicates that the operation member has not been held over the display surface 43A for inputting an instruction and thus no instruction has been input. When obtaining the result of NO in step SP33, the controlling part 20 returns to step SP25.

The result of NO in step SP31 indicates that the recording end instruction may have been input through the holding-over operation. When obtaining the result of NO in step SP31, the controlling part 20 proceeds to step SP35.

The controlling part 20 determines in step SP35 whether the region position detected through the holding-over operation is within the lower input region CIA4 and its region area is equal to or more than the second area threshold value.

The result of YES in step SP35 indicates that a palm as the operation member has been held over substantially the lower half of the display surface 43A to input the recording end instruction.

When obtaining the result of YES in step SP35, the controlling part 20 proceeds to the next step SP36. Thus the controlling part 20 controls the photographing part 22 and the codec 29 to end the animation photographing processing (to end the recording of the photographing) in step SP36, and then returns to step SP25.

The result of NO in step SP35 indicates that the operation member has not been held over the display surface 43A for inputting an instruction and thus no instruction has been input. When obtaining the result of NO in step SP35, the controlling part 20 returns to step SP25.

The controlling part 20 appropriately performs the processings in step SP1 to step SP36 in the photographing mode and thus controls the photo shooting or animation photographing of a subject according to the instruction input through the holding-over operation on the display surface 43A.

The result of YES in step SP2 indicates that the transition to the reproduction mode or the power-off is instructed to end the photographing mode. When obtaining the result of YES in step SP2, the controlling part 20 proceeds to step SP37. The controlling part 20 thus ends the photographing control processing procedure RT1 in step SP37.

(1-8 Operations and Effects of Embodiment)

With the above structure, when the operation member is held over the display surface 43A on the operation screen 16 in the photographing mode, the controlling part 20 in the digital camera 10 causes the operation screen 16 to detect a held-over region.

The controlling part 20 in the digital camera 10 determines the instruction input through the holding-over operation according to the held-over region detected by the operation screen 16 and controls the photo shooting or animation photographing of the subject according to the determined instruction.

Thus, when shooting a photo or photographing an animation of the subject, the controlling part 20 in the digital camera 10 can cause the digital camera 10 to input an instruction without applying an external force for pressing an operation key, thereby controlling the photo shooting or animation photographing of the subject according to the input.

With the above structure, when the operation member is held over the display surface 43A of the operation screen 16 in the photographing mode, the digital camera 10 determines the instruction input through the holding-over operation depending on the held-over region detected by the operation screen 16, and controls the photo shooting or animation photographing of the subject according to the determined instruction. The digital camera 10 can thus input an instruction without applying an external force for pressing an operation key during the photo shooting or animation photographing of the subject, and can control the photo shooting or animation photographing of the subject according to the input. The digital camera 10 can thus prevent an operator's hand's jiggling during the photographing.

Actually, the digital camera 10 inputs the photographing preparation instruction of preparing the photo shooting or the photographing instruction of shooting a photo through the holding-over operation on the display surface 43A when shooting a photo of a subject in the photographing mode. Thus, the digital camera 10 can prevent an operator's hand's jiggling for inputting the photographing preparation instruction or photographing instruction when shooting a photo of the subject.

The digital camera 10 inputs the photographing instruction through the holding-over operation on the display surface 43A when shooting a photo of the subject during the animation photographing in the photographing mode. The digital camera 10 can prevent an operator's hand's jiggling for inputting the photographing instruction also when shooting a photo of the subject during the animation photographing.

The digital camera 10 inputs the recording start instruction or the recording end instruction through the holding-over operation on the display surface 43A during the animation photographing of the subject in the photographing mode. The digital camera 10 can prevent an operator's hand's jiggling also when starting or ending the animation photographing of the subject.

The digital camera 10 inputs the zoom-in instruction or the zoom-out instruction through the holding-over operation on the display surface 43A when narrowing or widening the photographing range during the animation photographing of the subject. The digital camera 10 can prevent an operator's hand's jiggling for changing the photographing range during the animation photographing of the subject.

The digital camera 10 inputs the fading instruction through the holding-over operation on the display surface 43A during the animation photographing of the subject. The digital camera 10 can thus prevent an operator's hand's jiggling for inputting the fading instruction during the animation photographing of the subject. The digital camera 10 can edit the dynamic images obtained through the animation photographing to be faded while photographing the animation of the subject.

The digital camera 10 adjusts how much the dynamic image is faded depending on a change in the distance between the operation member held over the display surface 43A and the display surface 43A.

The digital camera 10 also adjusts the time for changing how much the dynamic image is faded, depending on the time for moving the operation member closer to or away from the display surface 43A when fading the dynamic image.

Thus the digital camera 10 can easily fade the dynamic image in a desired state without a complicated presetting for the fade processing.

While photographing an animation of a subject, the digital camera 10 displays the photographing state presenting image for confirming the photographing state of the subject on the operation screen 16. The digital camera 10 displays the icons or texts indicating the use state of the digital camera 10 or a state of the animation photographing over the photographing state presenting image.

The digital camera 10 inputs the moving instruction of moving an icon or text onto the photographing state presenting image through the holding-over operation on the display surface 43A. The digital camera 10 can thus prevent an operator's hand's jiggling for inputting the moving instruction during the animation photographing of the subject. The digital camera 10 can freely move the icon or text onto the photographing state presenting image during the animation photographing of the subject, and can accurately confirm the photographing state.

The digital camera 10 inputs various instructions through the holding-over operation on the display surface 43A in the photographing mode. Thus the digital camera 10 can easily input various instructions through an easy operation of holding the operation member over the display surface 43A while the display surface 43A is being viewed without confirming the position of the operation key for inputting the instruction. The digital camera 10 inputs various instructions through the holding-over operation on the display surface 43A, thereby reducing the number of operation keys and facilitating the structure.

<2. Modifications>

(2-1 Modification 1)

There has been described in the embodiment the case where five instruction input regions are preset for the display surface 43A and the instructions capable of being input are fixedly assigned to the five instruction input regions.

However, the present invention is not limited thereto, and at least one instruction input region may be set for the display surface 43A, such as the full face of the display surface 43A, two divisions, three divisions, four divisions or six divisions. The present invention may arbitrarily change the instructions to be assigned to the instruction input regions while previously assigning the instructions capable of being input to the instruction input regions.

In other words, the present invention may arbitrarily change the instructions to be assigned to the instruction input regions out of the instructions previously assigned to the instruction input regions when arbitrarily changing the instructions to be assigned to the instruction input regions. The present invention may prepare more instructions than the instruction input regions to assign desirable instructions to the instruction input regions, thereby changing the instructions to be assigned to the instruction input regions.

With the above structure, the present invention can select the instructions to be assigned to the instruction input regions depending on the user's request, thereby easily inputting the instructions and improving the usability of the digital camera.

The present invention may assign the fading instruction or the moving instruction to the instruction input regions, and may assign other various instructions such as power-on instruction or power-off instruction.

(2-2 Modification 2)

There has been described in the embodiment the case where the region's gravity center position, the region area, the region's right end position, the region's left end position, the region's upper end position and the region's lower end position are detected through the holding-over operation and are used to determine an instruction input through the holding-over operation.

However, the present invention is not limited thereto, and may detect only the region's gravity center position and the region area through the holding-over operation and use the same to determine the instruction input through the holding-over operation. With the above structure, the present invention can reduce the information to be used for determining the instruction input through the holding-over operation and thus facilitate the instruction determination processing. The present invention may detect the center position of the held-over region instead of the region's gravity center position, and may use it for determining the instruction input through the holding-over operation.

(2-3 Modification 3)

There has been described in the embodiment the case where the dynamic image data obtained by the animation photographing is appropriately faded while photographing the animation of a subject. However, the present invention is not limited thereto, and may perform various effects such as an airbrushing processing, a mosaic processing, and a processing of changing chroma such as sepia or monochrome on the dynamic image data obtained by the animation photographing while photographing the animation of the subject.

(2-4 Modification 4)

There has been described in the embodiment the case where a photo of a subject is photographed, an animation thereof is photographed and a photo is shot during the animation photographing. However, the present invention is not limited thereto and only either one of the photo shooting and the animation photographing of the subject may be performed and the photo shooting and the animation photographing of the subject may be performed separately.

(2-5 Modification 5)

There has been described in the embodiment the case where the input of the fading instruction is preset to be valid or invalid in the menu display mode.

However, the present invention is not limited thereto, and there can be displayed, on the photographing state presenting image, an icon for setting the input of the fading instruction to be valid or invalid in the photographing mode or during the animation photographing.

The present invention may designate the icon through the holding-over operation in the photographing mode or during the animation photographing for setting the input of the fading instruction to be valid or invalid.

(2-6 Modification 6)

There has been described in the embodiment the case where when the photographing instruction is input while the preparation of the photo shooting is not completed, the focus or exposure of the part corresponding to the region's gravity center position within the photographing range is adjusted to complete the preparation of the photo shooting and then to perform the photo shooting processing.

However, the present invention is not limited thereto, and when the photographing instruction is input while the preparation of the photo shooting is not completed, a face detection processing can be performed on the photographing range to detect a person's face. The present invention then adjusts the focus or exposure of the detected face to prepare the photo shooting and then performs the photo shooting processing.

(2-7 Modification 7)

In the embodiment, the photographing apparatus according to the present invention is applied to the digital camera 10 shown in FIGS. 1 to 26. However, the present invention is not limited thereto, and can be applied to an information processing apparatus such as a computer having a photographing function, a cell phone having a photographing function, a PDA (Personal Digital Assistance) having a photographing function and a portable game machine having a photographing function.

The present invention can be applied to variously-configured photographing apparatuses such as a digital still camera having only a photo shooting function or a digital video camera having only an animation photographing function.

(2-8 Modification 8)

In the embodiment, a photographing control program according to the present invention is applied to a photographing control program previously stored in the internal memory of the controlling part 20 described with reference to FIGS. 1 to 26. There has been described the case where the controlling part 20 performs the photographing control processing procedure RT1 described with reference to FIGS. 22 to 26 according to the photographing control program.

However, the present invention is not limited thereto, and the digital camera 10 may install the photographing control program stored in a computer-readable recording medium. The controlling part 20 may perform the photographing control processing procedure RT1 according to the installed photographing control program.

The digital camera 10 may install the photographing control program from the outside via a wired or wireless communication medium such as local area network, Internet or digital satellite broadcasting.

The computer-readable recording medium for installing the photographing control program in the digital camera 10 and making it executable may be realized in a package medium such as a flexible disk.

The computer-readable recording medium for installing the photographing control program in the digital camera 10 and making it executable may be realized in a package medium such as a CD-ROM (Compact Disc-Read Only Memory).

The computer-readable recording medium for installing the photographing control program in the digital camera 10 and making it executable may be realized in a package medium such as a DVD (Digital Versatile Disc).

The computer-readable recording medium may be realized not only in a package medium but also in a semiconductor memory or magnetic disk in which various programs are temporarily or permanently stored.

A means for storing the photographing control program in the computer-readable recording medium may utilize a wired or wireless communication medium such as local area network, Internet or digital satellite broadcasting. The computer-readable recording medium may store therein the photographing control program via various communication interfaces such as a router or modem.

(2-9 Modification 9)

There has been described in the embodiment the case where the photographing part 22 including the optical unit 23, the imaging device 24, the AFE circuit 27 and the digital processing circuit 28 shown in FIGS. 1 to 26 is applied as the photographing part for photographing a subject. However, the present invention is not limited thereto and variously-configured photographing parts can be widely applied.

(2-10 Modification 10)

There has been described in the embodiment the case where the operation screen 16 shown in FIGS. 1 to 26 is applied as an operation screen for, when the operation member is held over the surface, detecting a held-over region of the operation member on the surface.

However, the present invention is not limited thereto, and other variously-configured operation screens may be widely applied, such as an operation screen having no display function and having only a function as operating part for, when the operation member is held over the surface, detecting a held-over region.

(2-11 Modification 11)

There has been described in the embodiment the case where the controlling part 20 shown in FIGS. 1 to 26 is applied as a controlling part for controlling the photographing of a subject by the photographing part according to the held-over region detected by the operation screen.

However, the present invention is not limited thereto, and can apply a CPU (Central Processing Unit) or DSP (Digital Signal Processor). The present invention can be widely applied to variously-configured controlling parts such as controlling circuit dedicated for hardware circuit configuration for controlling the photographing of a subject by the photographing part according to the held-over region detected by the operation screen.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-254248 filed in the Japan Patent Office on Nov. 5, 2009, the entire content of which is hereby incorporated by reference.

The invention claimed is:

1. An electronic device including a digital camera function comprising:
    circuitry configured to
        divide an area of a panel of the electronic device into a plurality of regions, each region being assigned one or more digital camera actions, each camera action corresponding to a type of operation member,
        sense the region over which an operation member is held without the operation member touching the panel,
        determine whether the operation member is either an operator's finger or palm; and
        control at least one digital camera operation based on the region sensed without the operation member touching the panel and based on the type of operation member,
        wherein the controlled at least one camera operation includes a zoom-in operation, a zoom-out operation, an animation photographing process, and a fading instruction, which each correspond to one of four regions.

2. The electronic device according to claim 1, wherein the circuitry further senses the region over which the operation member is held by determining a size of the operation member.

3. The electronic device according to claim 2, wherein the controlled at least one digital camera operation is a photo taking operation that is executed when the circuitry senses an operator's finger as the operation member.

4. The electronic device according to claim 1, wherein the plurality of regions includes a right side of the panel, a left side of the panel, a top side of the panel and a bottom side of the panel.

5. The electronic device according to claim 4, wherein the sensed operation member is an operator's palm.

6. The electronic device according to claim 1, wherein the circuitry senses the region over which the operation member is held by determining both a size and position of the operation member, and the circuitry controls the digital camera operation based on the determined size and position.

7. The electronic device according to claim 1, wherein the circuitry senses the region over which the operation member is held by determining a size of the operation member and by determining the region in which the operation member is held over the area of the panel by defining the region's right end position, left end position, upper end position, and lower end position.

8. The electronic device according to claim 7, wherein the sensed operation member is an operator's finger.

9. The electronic device according to claim 1, wherein the circuitry further senses if a size of the operation member is changing.

10. The electronic device according to claim 1, wherein the circuitry further senses multiple sizes of the operation member and controls the at least one digital camera operation based on a largest of the sensed multiple sizes.

11. The electronic device according to claim 1, wherein the circuitry senses both of size and position of the operation member.

12. The electronic device according to claim 1, wherein the circuitry further senses multiple operation members simultaneously held over different areas of the panel.

13. The electronic device according to claim 1, wherein the electronic device is a digital camera.

14. The electronic device according to claim 1, wherein the panel emits infrared rays, and the circuitry senses reflected of the infrared rays to sense the operation member held over a region of the panel.

15. An electronic device including a digital camera function comprising:
means for dividing an area of a panel of the electronic device into a plurality of regions, each region being assigned one or more digital camera actions, each camera action corresponding to a type of operation member;
means for sensing an area of a panel over which an operation member is held without the operation member touching the panel by determining whether the operation member is either an operator's finger or palm; and
means for controlling at least one digital camera operation based on the region sensed without the operation member touching the panel and based on the type of operation member,
wherein the controlled at least one camera operation includes a zoom-in operation, a zoom-out operation, an animation photographing process, and a fading instruction, which each correspond to one of four regions.

16. A method of controlling an electronic device including a digital camera function and a panel, the method comprising:
dividing an area of a panel of the electronic device into a plurality of regions, each region being assigned one or more digital camera actions, each camera action corresponding to a type of operation member;
sensing an area of the panel over which an operation member is held without the operation member touching the panel by determining whether the operation member is either an operator's finger or palm; and
controlling, via a processor, at least one digital camera operation based on the region sensed without the operation member touching the panel and based on the type of operation member,
wherein the controlled at least one camera operation includes a zoom-in operation, a zoom-out operation, an animation photographing process, and a fading instruction, which each correspond to one of four regions.

17. The method of controlling an electronic device according to claim 16, wherein the sensing further senses the region over which the operation member is held by determining a size of the operation member.

18. The method of controlling an electronic device according to claim 17, wherein the at least one controlled digital camera operation is a photo taking operation that is executed when sensing an operator's finger as the operation member.

19. The method of controlling an electronic device according to claim 16, wherein the plurality of regions includes a right side of the panel, a left side of the panel, a top side of the panel and a bottom side of the panel.

20. The method of controlling an electronic device according to claim 19, wherein the sensed operation member is an operator's palm.

21. The method of controlling an electronic device according to claim 16, wherein the sensing senses the region over which the operation member is held by determining both a size and position of the operation member, and the controlling controls the digital camera operation based on the determined size and position.

22. The method of controlling an electronic device according to claim 16, wherein the sensing senses the region over which the operation member is held by determining a size of the operation member and by determining the region of the operation member held over the area of the panel by defining the region's right end position, left end position, upper end position, and lower end position.

23. The method of controlling an electronic device according to claim 22, wherein the sensed operation member is an operator's finger.

24. The method of controlling an electronic device according to claim 16, wherein the sensing further senses if a size of the operation member is changing.

25. The method of controlling an electronic device according to claim 16, wherein the sensing further senses multiple sizes of the operation member and the controlling controls the at least one digital camera operation based on a largest of the sensed multiple sizes.

26. The method of controlling an electronic device according to claim 16, wherein the sensing senses both of a size and position of the operation member.

27. The method of controlling an electronic device according to claim 16, wherein the sensing senses multiple operation members simultaneously held over different areas of the panel.

28. The method of controlling an electronic device according to claim 16, wherein the electronic device is a digital camera.

* * * * *